US007478041B2

(12) United States Patent
Ichikawa et al.

(10) Patent No.: US 7,478,041 B2
(45) Date of Patent: Jan. 13, 2009

(54) SPEECH RECOGNITION APPARATUS, SPEECH RECOGNITION APPARATUS AND PROGRAM THEREOF

(75) Inventors: Osamu Ichikawa, Ebina (JP); Tetsuya Takiguchi, Yokohama (JP); Masafumi Nishimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 10/386,726

(22) Filed: Mar. 12, 2003

(65) Prior Publication Data

US 2003/0177006 A1 Sep. 18, 2003

(30) Foreign Application Priority Data

Mar. 14, 2002 (JP) ............................. 2002-070194
Sep. 18, 2002 (JP) ............................. 2002-272318

(51) Int. Cl.
*G10L 15/20* (2006.01)

(52) U.S. Cl. ....................... 704/233; 704/231; 704/226; 704/208; 704/275; 381/92; 381/122; 379/406.08

(58) Field of Classification Search ................. 704/233, 704/231, 226, 275, 208; 381/92, 122; 379/406.08
See application file for complete search history.

(56) References Cited

U.S. PATENT DOCUMENTS 5,335,011 A * 8/1994 Addeo et al. ............... 348/14.1

(Continued)

FOREIGN PATENT DOCUMENTS

EP 867860 A2 * 9/1998

(Continued)

OTHER PUBLICATIONS

Yves Grenier, "A Microphone Array for Car Environments", Proceedings of IEEE ICASSP '92, pp. I.305-I.308, Mar. 1992.*

(Continued)

*Primary Examiner*—Vijay B Chawan
(74) *Attorney, Agent, or Firm*—Gibb & Rahman, LLC; Stephen C. Kaufman, Esq.

(57) ABSTRACT

Provided is a method for canceling background noise of a sound source other than a target direction sound source in order to realize highly accurate speech recognition, and a system using the same. In terms of directional characteristics of a microphone array, due to a capability of approximating a power distribution of each angle of each of possible various sound source directions by use of a sum of coefficient multiples of a base form angle power distribution of a target sound source measured beforehand by base form angle by using a base form sound, and power distribution of a non-directional background sound by base form, only a component of the target sound source direction is extracted at a noise suppression part. In addition, when the target sound source direction is unknown, at a sound source localization part, a distribution for minimizing the approximate residual is selected from base form angle power distributions of various sound source directions to assume a target sound source direction. Further, maximum likelihood estimation is executed by using voice data of the component of the sound source direction passed through these processes, and a voice model obtained by predetermined modeling of the voice data, and speech recognition is carried out based on an obtained assumption value.

3 Claims, 18 Drawing Sheets

U.S. PATENT DOCUMENTS

| | | | | | |
|---|---|---|---|---|---|
| 5,574,824 | A * | 11/1996 | Slyh et al. | 704/226 |
| 5,828,997 | A * | 10/1998 | Durlach et al. | 704/233 |
| 6,009,396 | A * | 12/1999 | Nagata | 704/270 |
| 6,151,575 | A * | 11/2000 | Newman et al. | 704/260 |
| 6,219,645 | B1 * | 4/2001 | Byers | 704/275 |
| 6,243,471 | B1 * | 6/2001 | Brandstein et al. | 381/92 |
| 6,707,910 | B1 * | 3/2004 | Valve et al. | 379/388.06 |
| 6,987,856 | B1 * | 1/2006 | Feng et al. | 381/92 |
| 2002/0193130 | A1 * | 12/2002 | Yang et al. | 455/501 |
| 2003/0014248 | A1 * | 1/2003 | Vetter | 704/226 |
| 2003/0040908 | A1 * | 2/2003 | Yang et al. | 704/233 |
| 2003/0097257 | A1 * | 5/2003 | Amada et al. | 704/208 |
| 2003/0125959 | A1 * | 7/2003 | Palmquist | 704/277 |
| 2004/0193411 | A1 * | 9/2004 | Hui et al. | 704/233 |

FOREIGN PATENT DOCUMENTS

| | | | |
|---|---|---|---|
| JP | 06-195097 | * | 7/1994 |
| JP | 09-251299 | | 9/1997 |
| JP | 10-207490 | | 8/1998 |
| JP | 2000-047699 | | 2/2000 |
| JP | 2001-075594 | | 3/2001 |
| JP | 2001-309483 | | 11/2001 |
| JP | 2002-062895 | | 2/2002 |

OTHER PUBLICATIONS

Ming Zhang et al., "A New Method of Tracking Talker Location for Microphone Array in the Near Field", IEEE ASSP Workshop on Applications of Signal Processing to Audio and Acoustics, pp. 177-180, Oct. 1995.*

Ming Zhang et al., "Tracking Direction of Speaker for Microphone Array in the Far Field", Proceedings of the IEEE Singapore International Conference on Networks/Information Engineering, pp. 541-544, Jul. 1995.*

D. Giuliani et al., "Hands-Free Continuous Speech Recognition in Noisy Environment Using a Four-Microphone Array", Proceedings of IEEE ICASSP '95, pp. 860-863, May 1995.*

Farrell, et al., "Beamforming Microphone Arrays for Speech Enhancement", Proceedings of IEEE ICASSP-92, vol. 1, pp. 285-288, Mar. 1992.*

Nordholm, et al., "Aadaptive Array Noise Suppression of Handsfree Speaker Input in Cars", IEEE Transactions on Vehicular Technology, vol. 42, Issue 4, pp. 514-518, Nov. 1993.*

Huang, et al., "A Biomimetic System for Localization and Separation of Multiple Sound Sources", IEEE Transactions on Instrumentation and Measurement, vol. 44, No. 3, Jun. 1995, pp. 733-738.*

Meyer et al., "Noise Cancelling for Microphone Arrays", Proceedings of IEEE ICASSP-97, vol. 1, pp. 211-213, Apr. 1997.*

Dahl et al., "Simultaneous Echo Cancellation and Car Noise Suppression Employing a Microphone Array", Proceedings of IEEE ICASSP-97, vol. 1, pp. 239-242, Apr. 1997.*

Zhao et al., "Application of Microphone Array for Speech Coding in Noisy Environment", Conference Record of the Asilomar Conference on Signals, Systems and Computers, 1996, vol. 1, pp. 45-49.*

Brandstein et al., "Microphone-array localization error estimation with application to sensor placement," The Journal of the Acoustical Society of America, Jun. 1996, pp. 3807-3816.*

Fuda et al., "Speech Recognition Under the Nonstationary Noise Using Two Channel Target Speech Detection", IEICE Technical Report, pp. 1-5, 2001.

Mizumachi et al., "Noise Reduction by Paired-Microphones Using Spectral Subtraction", IEICE Trans., A vol. J82-A No. 4, pp. 503-512, 1999.

Asano et al., "Application of Subspace-based Speech Enhancement to Speech Recognition", IEICE Technical Report, pp. 1-7, 1997.

Nagata et al., "Two-Channel Adaptive Microphone Array with Target Tracking", IEICE Trans., A vol. J82-A No. 6, pp. 860-866, 1999.

Nishiura et al. "Multiple Beamforming with Source Localization Based on CSP Analysis". IEICE Transactions, vol. J83-D-II No. 7, pp. 1610-1619, 2000.

Nakamura et al. "Design and Status of Sound Scene Database in Real Acoustical Environments". ASJ Papers, 1-R-10, pp. 137-138, 1998.

* cited by examiner

SPEECH RECOGNITION APPARATUS, SPEECH RECOGNITION APPARATUS AND PROGRAM THEREOF

BACKGROUND OF THE INVENTION

The present invention relates to a speech recognition system, especially a method for eliminating noise by using a microphone array.

These days, resulting from the improved performance of a speech recognition program, speech recognition has been coming into use in many fields. However, when trying to realize speech recognition with high accuracy without imposing a duty to wear a headset type microphone or the like on a speaker, i.e., in an environment of a distance between the microphone and the speaker, cancellation of background noise becomes an important subject. The method for canceling noise by using a microphone array has been considered as one of the most effective means.

FIG. 18 schematically shows a configuration of a conventional speech recognition system using a microphone array.

Referring to FIG. 18, the speech recognition system using the microphone array is provided with a voice input part 181, a sound source localization part 182, a noise suppression part 183, and a speech recognition part 184.

The voice input part 181 is a microphone array constituted of a plurality of microphones.

The sound source localization part 182 assumes a sound source direction (location) based on an input in the voice input part 181. The most often employed system for assuming a sound source direction is a system which assumes, as a sound source coming direction, a maximum peak of a power distribution for each angle where an output power of a delay and sum microphone array is taken on a vertical axis, and a direction for setting directional characteristics is taken on a horizontal axis. To obtain sharper peak, a virtual power called Music Power may be set on the vertical axis. When there are three or more microphones, not only the sound source direction but also a distance can be assumed.

The noise suppression part 183 suppresses noise for the inputted sound based on the sound source direction (location) assumed by the sound source localization part 182 to emphasize a voice. As a method for suppressing noise, normally, one of the following methods is used in many cases.

[Delay and Sum]

This is a method for delaying inputs from the individual microphones in the microphone array by respective delay amounts to sum them up, and thereby setting only voices from a target direction in-phase to reinforce them. By such a delay amount, a direction for setting directional characteristics is decided. A voice from a direction other than the target direction is relatively weakened because of a phase shift.

[Griffiths Jim Method]

This is a method for subtracting "a signal in which a noise component is a main component" from the output by the delay and sum. When there are two microphones, the signal thereof is generated as follows. First, the phases of the one of a combination of signals set in-phase with respect to the target sound source is inversed to be added up with the other, whereby a target voice component is canceled. Then, in the noise section, an adaptive filter is designed so as to minimize noise.

[Method Using Delay and Sum in Combination with 2-Channel Spectral Subtraction]

This is a method for subtracting an output of a sub-beam former outputting mainly a noise component from an output of a main-beam former outputting mainly a voice from the target sound source (Spectral Subtraction) (e.g., see Nonpatent Documents 1, and 2).

[Minimum Variance Method]

This is a method for designing a filter so as to form a directional null of directional characteristics with respect to a directional noise source (e.g., see Nonpatent Document 3).

The speech recognition part 184 carries out speech recognition by generating voice features from the signal having the noise component canceled as much as possible by the noise suppression part 183, and collating patterns for time history of the voice features based on a feature dictionary and time extension.

[Non-Patent Document 1]

Nunoda, Nagata, and Abe: "Voice recognition under unsteady noise using two-channel voice detection", technical research report 2001-25 by Institute of Electronics, Information and Communication Engineers

[Nonpatent Document 2]

Mizumachi and Akagi: pp. 503-512, "Noise cancellation method by spectral subtraction using microphone pair", treatise A Vol. J82-A No. 4, 1999 by Institute of Electronics, Information and Communication Engineers"

[Nonpatent Document 3]

Asano, Hayami, Yamada, and Nakamura: "Application of voice emphasis method using sub-spacing method to voice recognition", technical research report EA97-17 by Institute of Electronics, Information and Communication Engineers"

[Nonpatent Document 4]

Nagata, and Abe: pp. 503-512, "Studies on speaker tracking 2-channel microphone array", treatise A Vol. J82-A No. 4 by Institute of Electronics, Information and Communication engineers"

As described above, in the speech recognition technology, when realizing speech recognition with high accuracy in an environment of a distance between the microphone and the speaker, cancellation of background noise becomes an important task. The method for assuming the sound source direction by using the microphone array to cancel noise is considered as one of the most effective means.

However, to enhance noise suppression performance by the microphone array, a large number of microphones is generally needed, which in turn necessitates special hardware to execute simultaneous multichannel inputs. On the other hand, if the microphone array is constituted by a small number of microphones (e.g., 2-channel stereo input), a beams of directional characteristics of the microphone array is gently spread to be prevented from being sufficiently focused on the target sound source. Consequently, an incursion rate of noise from the surroundings is high.

Thus, in order to enhance the performance of speech recognition, a certain processing such as estimation and subtraction of an arriving noise component to be mixed is necessary. However, in the above-described noise suppression methods (delay and sum, minimum variance method, and the like), no functions have been available to estimate and actively subtract the mixed noise component.

In addition, the method for using the delay and sum in combination with the 2-channel spectral subtraction, since the noise component is estimated for the cancellation, can suppress the background noise to a certain extent. However, since the noise is estimated by "a point," an accuracy of the estimation has not always been high.

On the other hand, as problems resulting with small-scale microphone array (becoming conspicuous especially in 2-channel stereo input), there is an aliasing problem, in which assumption accuracy of a noise component is reduced at a specific frequency corresponding to a noise source direction.

As measures to suppress the effects of such aliasing, a method for narrowing spacing between microphones, and a method for arranging the microphone in an inclined state are conceivable (e.g., see Nonpatent Document 4).

However, if the microphone spacing is narrowed, directional characteristics around a lower frequency domain may be deteriorated, and accuracy of speaker direction identification may be reduced. Consequently, in the beam former such as 2-channel spectral subtraction, the microphone spacing cannot be narrowed beyond a given level, and there is a limit to the capability of suppressing the effects of aliasing.

In terms of the method for arranging the microphone in the inclined state, in the two microphones, by providing a sensitivity difference in sound waves from an oblique direction, a sound wave can be made different in gain balance from a sound wave from the front. However, because of only a small sensitivity difference in the normal microphone, even in the case of this method, there is a limit to the capability of suppressing the effects of aliasing.

SUMMARY OF THE INVENTION

Thus, the object of the present invention is to provide, in order to realize speech recognition with high accuracy, a method for efficiently canceling background noise of a source other than a target direction sound source, and a system using the same.

Another object of the present invention is to provide a method for effectively suppressing inevitable noise such as effects of aliasing in a beam former, and a system using the same.

The present invention attaining the objects written above is materialized as a speech recognition apparatus which is configured as followed. That is, the speech recognition apparatus is characterized comprising; a microphone array for recording a voice; a database for storing characteristics (profile) of a base form sound from possible various sound source directions and profile of a non-directional background sound; a sound source localization part for estimating a sound source direction of the voice recorded by the microphone array; a noise suppression part for extracting voice data of a component of the assumed sound source direction of the recorded voice by using the sound source direction estimated by the sound source localization part, the profiles of the base form sound and the profile of the background sound stored in the database; and a speech recognition part for executing speech recognition of the voice data of the component of the sound source direction.

Here, the noise suppression part, more specifically, compares the profile of the recorded voice with the profile of the base form and the profile of background sound, and based on the comparison result, decomposes the recorded voice into a component of a sound source direction and a component of non-directional background sound, and extracts a voice data in the component of the sound source direction.

This sound source localization part assumes the sound source direction. However, if a microphone array is constituted of three or more microphones, a distance to the sound source can also be assumed. Hereinafter, an explanation will be done considering a sound source direction or a sound source location means mainly a sound source direction. Needless to say, however, a distance to the sound source can be considered when necessary.

In addition, the speech recognition apparatus concerning to the present invention is characterized comprising; in addition to the microphone array and the database mentioned above, a sound source localization part for comparing profile of the voice recorded by the microphone array with the profiles of the base form and background sounds stored in the database to assume a sound source direction of the recorded voice; and a speech recognition part for executing speech recognition of voice data of a component of the sound source direction assumed by the sound source localization part.

Here, the sound source localization part, more specifically, compares profile obtained by linear combination of the profile of the base form sound arriving from each possible sound location and background sound with profile of the recorded voice, and assumes a sound source location of the best-matched combination as a sound source location of the recorded voice based on a result of the comparison.

A speech recognition apparatus, another part concerning to the present invention is characterized by comprising: a microphone array for recording a voice; a sound source localization part for assuming a sound source direction of the voice recorded by the microphone array; a noise suppression part for canceling from the recorded voice, a component of a sound source other than the sound source direction assumed by the sound source localization part; a maximum likelihood estimation part for executing maximum likelihood estimation by using the recorded voice processed at the noise suppression part, and a voice model obtained by executing predetermined modeling of the recorded voice; and a speech recognition part for executing speech recognition of a voice by using the maximum likelihood estimation value assumed by the maximum likelihood estimation part.

Here, the maximum likelihood estimation part can use a smoothing solution averaging, in frequency direction, signal powers among adjacent sub-band points with respect to a predetermined frame of the recorded voice as a voice model of the recorded voice.

Moreover, a variance measurement part for measuring variance of observation error in a noise section, and modeling error variance in a voice section of the recorded voice is provided. The maximum likelihood estimation part calculates the maximum likelihood estimation value by using the observation error variance and the modeling error variance measured by the variance measurement part.

Further object of the present invention is materialized as a speech recognition method to recognize a voice recorded by use of a microphone array by controlling a computer. That is, the speech recognition method is characterized by comprising: a voice inputting step of recording a voice by using the microphone array, and storing voice data in a memory; a sound source localization step assuming a sound source direction of the recorded voice based on the voice data stored in the memory, and storing a result of the assumption in a memory; a noise suppression step of decomposing the recorded voice into a component of a sound of the assumed sound source location, and a component of a non-directional background sound based on the result of the estimation stored in the memory, extracting and storing voice data of the component of the assumed sound source direction of the recorded voice based on a result of the processing and storing into a memory; and a speech recognition step recognizing the recorded voice based on the voice data of the component of the sound source direction stored in the memory.

Here, the noise suppression step, more precisely, includes a step of reading profile of background sound and profile of base form sound which is from a sound source direction matched with the estimation result of the sound source localization out of a memory storing profile of base form sound from possible various sound source locations and profile of background sound, a step of combining the read profiles with proper weights so as to approximate to the profile of the recorded voice, and a step of assuming and extracting a component from the assumed sound source location among the voice data stored in the memory based on information regarding the profiles of the base form and background sounds obtained by the approximation.

The speech recognition method concerning to the present invention is characterized by comprising: a voice inputting step of recording a voice by using the microphone array, and storing voice data in a memory; a sound source localization step of assuming a sound source direction of the recorded voice based on the voice data stored in the memory, and storing a result of the assumption in a memory; a noise suppression step of decomposing the recorded voice into a component of a sound of the assumed sound source location, and a component of a non-directional background sound based on the result of the estimation stored in the memory and information regarding pre-measured profile of a predetermined voice, and storing voice data in which the component of the background sound from the recorded voice is canceled into a memory; and a speech recognition step of recognizing the recorded voice based on the voice data in which the component of the background sound is canceled stored in the memory.

Here, the noise suppression step preferably includes a step of further decomposing and canceling a component of a noise arriving from a specific direction from the recorded voice if the noise is assumed to arrive from the specific direction.

A still further speech recognition method is characterized by comprising: a voice inputting step of recording a voice by using the microphone array, and storing voice data in a memory; a sound source localization step of obtaining profile for various voice input directions by combining profiles of base form and non-directional background sounds from a pre-measured specific sound source direction, comparing the obtained profile with profile of the recorded voice obtained from the voice data stored in the memory to assume a sound source direction of the recorded voice, and storing a result of the assumption in a memory; a noise suppression step of extracting and storing voice data of the component of the assumed sound source direction of the recorded voice based on the assumption result of the sound source direction stored in the memory, and the voice data; and a speech recognition step of recognizing the recorded voice based on voice data in which the component of the background sound is canceled stored in the memory.

Here, the sound source localization step, more specifically, includes a step of reading profiles of base form and background sounds for each voice input direction out of a memory storing profile of base form sound from possible various sound source directions and profile of non-directional background sound, a step of combining the read profiles of each voice input direction by incorporating proper weights to approximate the profile to the profile of the recorded voice, and a step of comparing the profile obtained by the combining with the profile of the recorded voice, and assuming a sound source direction of a base form sound corresponding to the profile obtained by the linear combination which is of small error as a sound source direction of the recorded voice.

Further speech recognition method concerning to the present invention is characterized by comprising: a voice inputting step of recording a voice by using the microphone array, and storing voice data in a memory; a sound source localization step assuming a sound source direction of the recorded voice based on the voice data stored in the memory, and storing a result of the assumption in a memory; a noise suppression step of extracting and storing voice data of a component of the assumed sound source direction of the recorded voice in a memory based on the assumption result of the sound source direction and the voice data stored in the memory; a maximum likelihood estimation step of calculating and storing a maximum likelihood estimation value in a memory by using the voice data of the component of the sound source direction stored in the memory, and voice data obtained by executing predetermined modeling of the voice data; and a speech recognition step recognizing the recorded voice based on the maximum likelihood estimation value stored in the memory.

Further speech recognition method concerning to the present invention is characterized by comprising: a voice inputting step of recording a voice by using the microphone array, and storing voice data in a memory; a sound source localization step of assuming a sound source direction of the recorded voice based on the voice data stored in the memory, and storing a result of the assumption in a memory; a noise suppression step of extracting and storing voice data of a component of the assumed sound source direction of the recorded voice in a memory based on the assumption result of the sound source direction and the voice data stored in the memory; a step of obtaining and storing a smoothing solution in a memory by averaging, in a frequency direction, signal powers among adjacent sub-band points with respect to a predetermined voice frame regarding the voice data of the component of the sound source direction stored in the memory; and a speech recognition step of recognizing the recorded voice based on the smoothing solution stored in the memory.

Furthermore, the present invention can be implemented as a program for realizing each function of the foregoing speech recognition apparatus by controlling a computer, or a program for executing a process corresponding to each step of the foregoing speech recognition method. These programs can be provided by being stored in a magnetic disk, an optical disk, a semiconductor memory, and other recording media to be distributed, and delivered through a network.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Next, description will be made of the first and second embodiments of the present invention with reference to the accompanying drawings.

According to the first embodiment described below, profile of a base form sound from each of various sound source directions, and profile of a nondirectional background sound are obtained beforehand and held. Then, when a voice is recorded in a microphone array, by using a sound source direction of the recorded voice and the profiles of the held base form and background sounds, voice data on an assumed sound source direction component in the recorded voice is extracted. By comparing profile of the recorded voice with the profile of the held base form and background sounds, a sound source direction of the recorded voice is assumed. These methods enable efficient cancellation of background noise of a source other than a target direction sound source.

According to the second embodiment, targeting a case where a large observation error such as effects of aliasing regarding a recorded voice is inevitably included, voice data is modeled to carry out maximum likelihood estimation. As a voice model by this modeling, a smoothing solution averaging, in frequency direction, signal powers among several adjacent sub-bands is used for a voice frame. For the voice data targeted for maximum likelihood estimation, data having a noise component suppressed from the recorded voice in a previous stage is used. This suppression of the noise component may be carried out by, in addition to the method of the first embodiment, a method of 2-channel spectral subtraction.

First Embodiment

In the first embodiment, profiles of predetermined base form and background sounds are prepared beforehand to be used for extraction of a sound source direction component and assumption of a sound source direction in a recorded voice. This method is called profile fitting.

Figure 1:
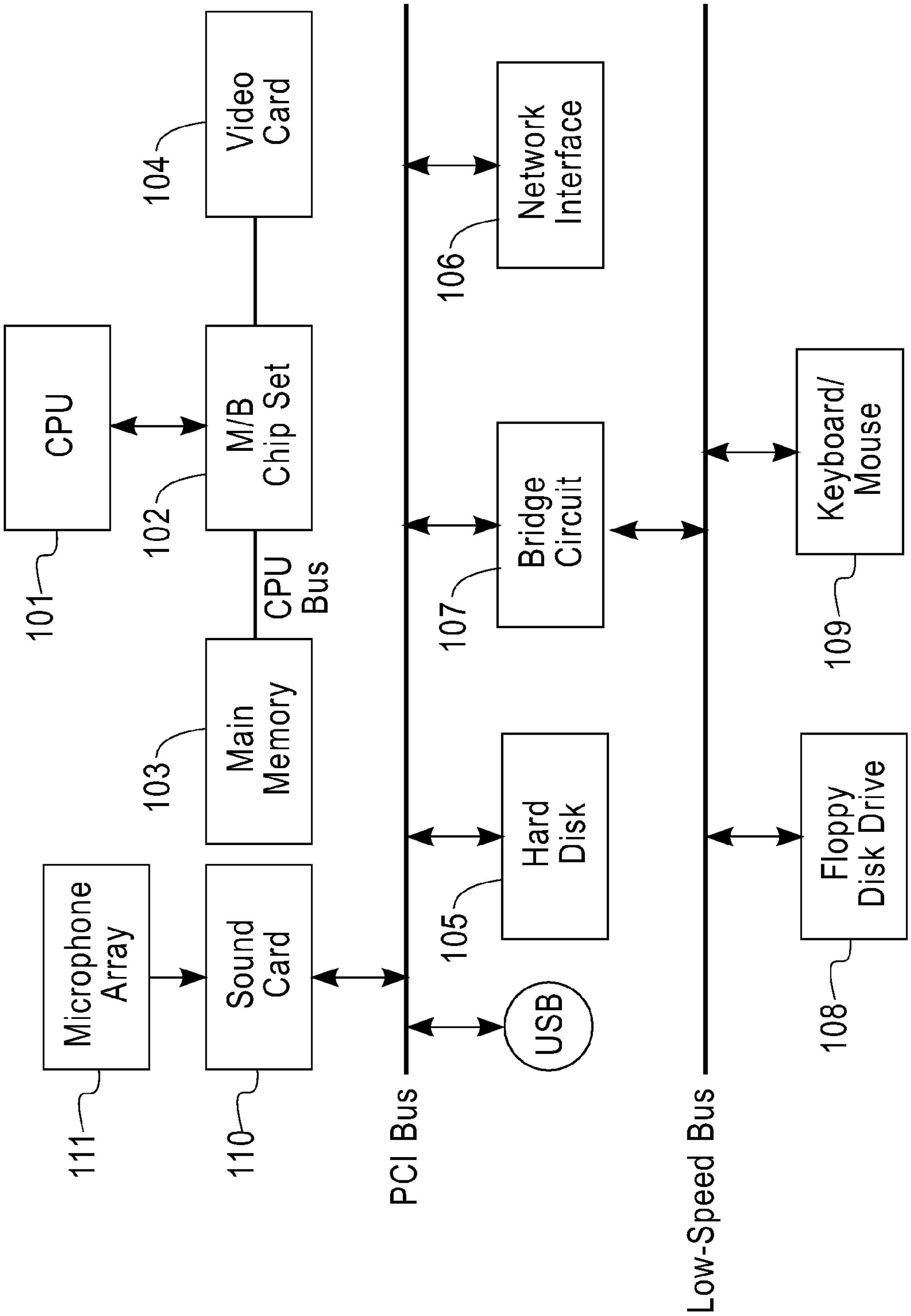
FIG. 1 is a schematic diagram showing an example of a hardware configuration of a computer apparatus suited to realization of a speech recognition system of a first embodiment.

FIG. 1 is a schematic diagram showing an example of hardware configuration of a computer suited to realization of a speech recognition system (apparatus) concerning to the first embodiment.

The computer shown in FIG. 1 is provided with a central processing unit (CPU) 101 as arithmetic operation means, a main memory 103 connected through a mother board (M/B) chip set 102 and a CPU bus to the CPU 101, a video card 104 similarly connected through the M/B chip set 102 and an accelerated graphics port (AGP) to the CPU 101, a hard disk 105 and a network interface 106 connected through a peripheral component interconnect (PCI) bus to the M/B chip set 102, and a floppy disk drive 108 and a keyboard/mouse 109 connected from this PCI bus through a bridge circuit 107 and a low-speed bus such as an industry standard architecture (ISA) bus to the M/B chip set 102. The computer is further provided with a sound card (sound chip) 110 and a microphone array 111 for inputting a voice to be processed, and convert it into voice data to be supplied to the CPU 101.

FIG. 1 shows only the example of the hardware configuration of the computer to realize the first embodiment. Other various constitutions can be employed as long as the present embodiment is applicable. For example, in place of the video card 104, only a video memory may be loaded, and image data may be processed in the CPU 101. Through an interface such as at attachment (ATA), a compact disk read only memory (CD-ROM) or digital versatile disk read only memory (DVD-ROM) drive may be installed.

Figure 2:
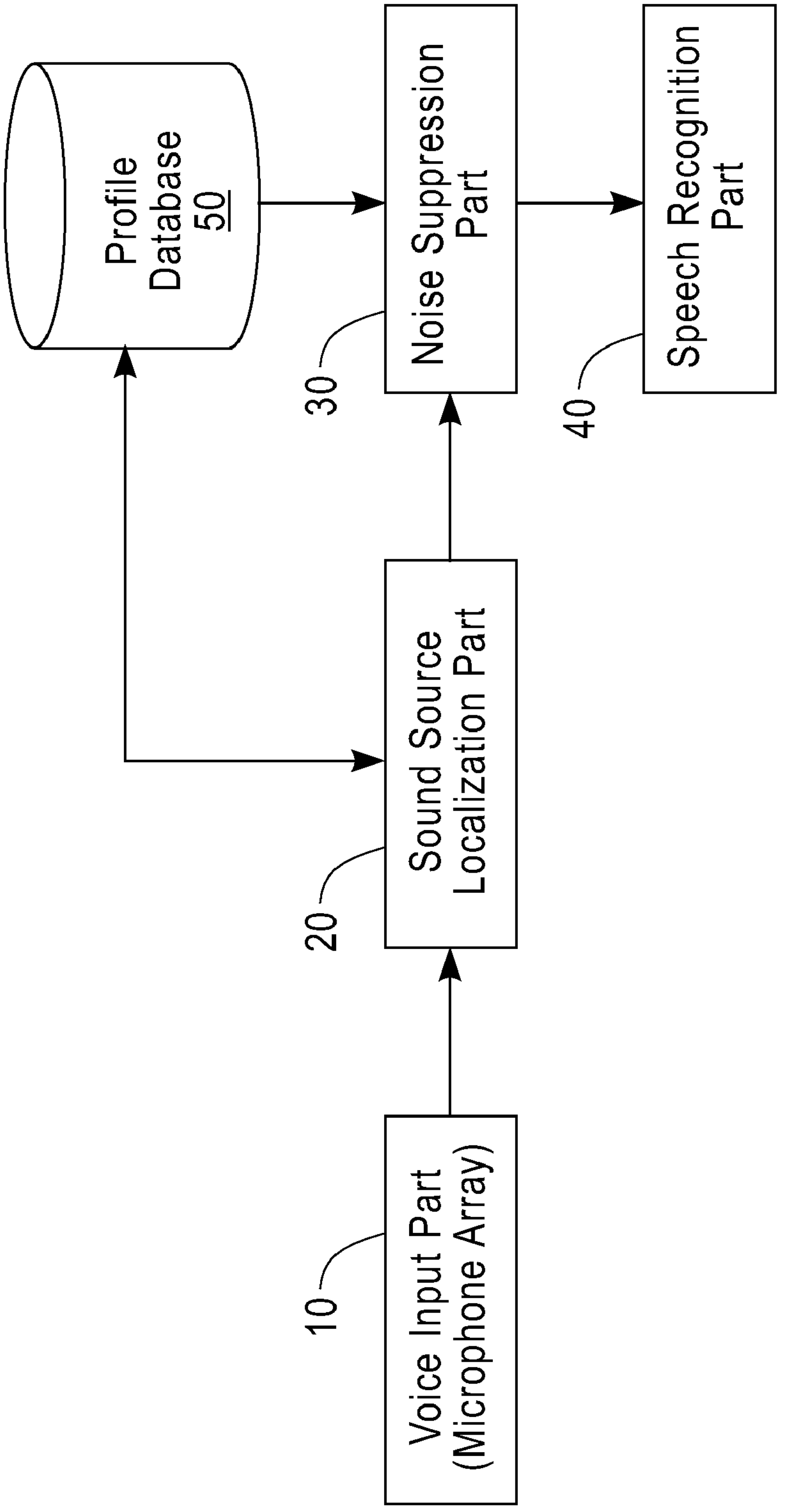
FIG. 2 is a diagram showing a configuration of the speech recognition system of the first embodiment realized by the computer apparatus shown in FIG. 1.

FIG. 2 shows a speech recognition system configuration of the embodiment realized by the computer shown in FIG. 1.

As shown in FIG. 2, the speech recognition system of the embodiment is provided with a voice input part 10, a sound source localization part 20, a noise suppression part 30, a speech recognition part 40, and a space characteristic (profile) database 50.

In terms of the above configuration, the sound source localization part 20, the noise suppression part 30, and the speech recognition part 40 constitute a virtual software block realized by controlling the CPU 101 based on a program executed in the main memory 103 of FIG. 1. The profile database 50 is realized by the main memory 103 and the hard disk 105. The program for controlling the CPU 101 to realize such functions can be provided by being stored in a magnetic disk, an optical disk, a semiconductor memory or other storage media to be distributed, and delivered through a network. In the embodiment, the program is inputted through the network interface 106 and the floppy disk drive 108 shown in FIG. 1, a not-shown CD-ROM Drive, or the like, to be stored in the hard disk 105. Then, the program stored into the hard disk 105 is read in the main memory 103 to be extracted, and executed by the CPU 101 to realize the function of each component shown in FIG. 2. Transfer of data between the components realized by the program-controlled CPU 101 is carried out through a cache memory of the CPU 101 or the main memory 103.

The voice input part 10 is realized by the microphone array 111 constituted of a number N of microphones, and the sound card 110 to record a voice. The recorded voice is converted into electric voice data to be transferred to the sound source localization part 20.

The sound source localization part 20 assumes a sound source location (sound source direction) of a target voice from a number N of voice data simultaneously recorded by the voice input part 10. Sound source location information assumed by the sound source localization part 20, and the number N of voice data obtained from the voice input part 10 are transferred to the noise suppression part 30.

The noise suppression part 30 outputs one voice data having noise of a sound from a sound source location other than that of the target voice canceled as much as possible (noise suppression) by using the sound source location information and the number N of voice data received from the sound source localization part 20. One noise-suppressed voice data is transferred to the speech recognition part 40.

The speech recognition part 40 converts the voice into a text by using one noise-suppressed voice data, and outputs the text. In addition, voice processing at the speech recognition part 40 is generally executed in a frequency domain. On the other hand, a output of the voice input part 10 is generally in a time domain. Thus, in one of the sound source localization part 20 and the noise suppression part 30, a conversion of the voice data is carried out from the frequency domain to the time domain.

The profile database 50 stores profile used for processing at the noise suppression part 30 or the sound source localization part 20 of the embodiment. The profile will be described later.

According to the embodiment, two types of microphone array profiles, i.e., profile of the microphone array 111 for a target direction sound source, and profile of the microphone array 111 for a nondirectional background sound, are used, whereby background noise of a sound source other than the target direction sound source is efficiently canceled.

Specifically, profile of the microphone array 111 for a target direction sound source, and profile of the microphone array 111 for a nondirectional background sound in the speech recognition system are measured beforehand for all frequency bands by using white noise and then, mixing weight of the two types of the profiles is assumed so that a difference between profile of the microphone array 111 assumed from speech data observed under an actual noise environment and a sum of the two types of the microphone array profiles can be minimum. This operation is carried out for each frequency to assume a target direction speech component (power by frequency) included in the observed data, whereby the voice can be reconstructed. In the speech recognition system shown in FIG. 2, the above-described method can be realized as a function of the noise suppression part 30.

The operation of assuming the target direction speech component included in the observed data is carried out in various directions around the microphone array 111 being one of the voice input part 10, and results are compared, whereby a sound source direction of the observed data can be specified. In the speech recognition system shown in FIG. 2, the above-described method can be realized as a function of the voice source location searching part 20.

The functions mentioned above are independent each other, therefore one of the functions can be used, or both can be used in combination. Hereinafter, the function of the noise suppression part 30 is first described, and then the function of the sound source localization part 20 is described.

Figure 3:
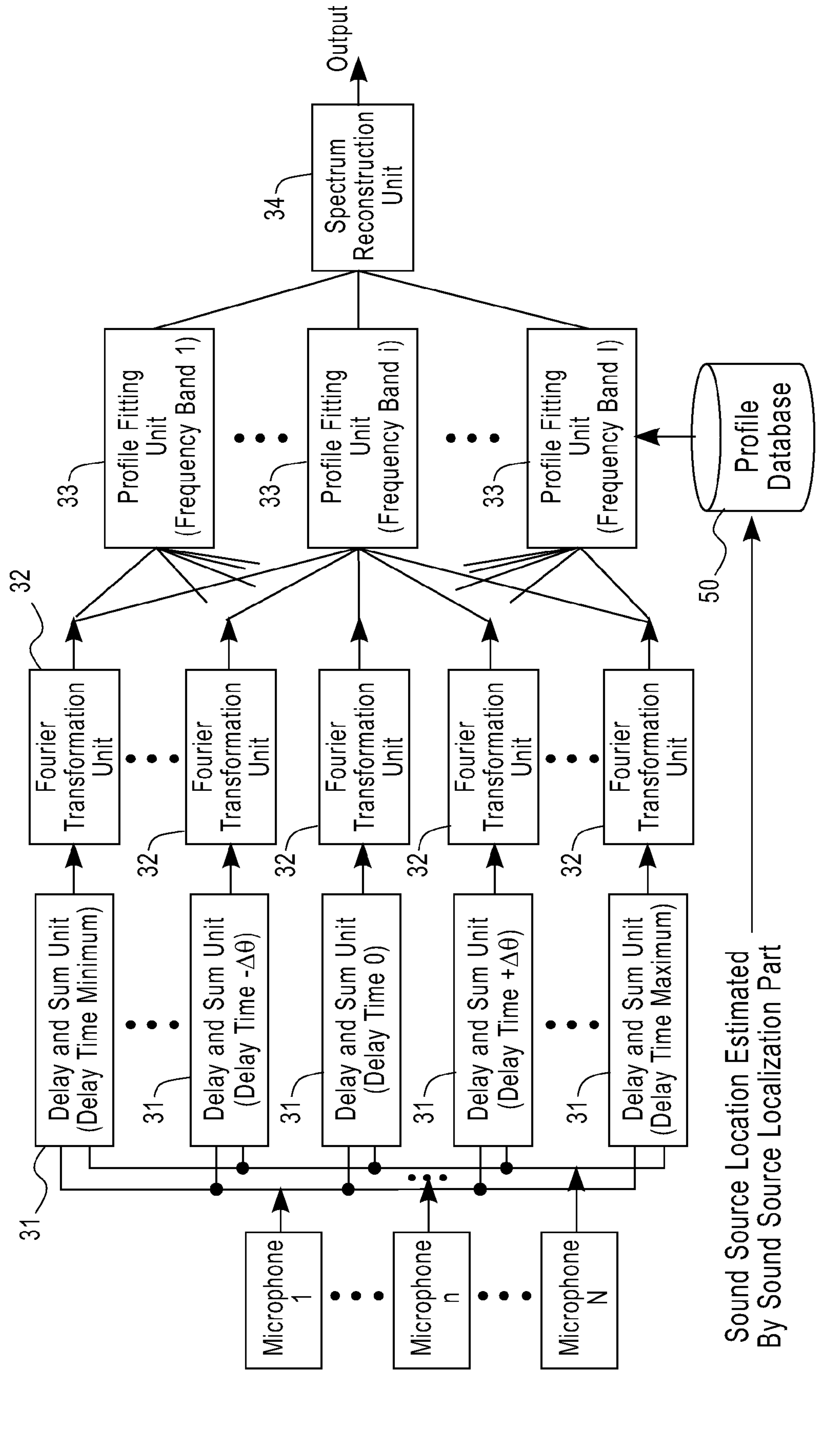
FIG. 3 is a diagram showing a configuration of a noise suppression part in the speech recognition part in the first embodiment.

FIG. 3 shows a configuration of the noise suppression part 30 in the speech recognition system concerning to the embodiment.

Referring to FIG. 3, the noise suppression part 30 is provided with a delay and sum unit 31, Fourier transformation unit 32, a profile fitting unit 33, and a spectrum reconstruction unit 34. The profile fitting unit 33 is connected to the profile database 50 storing sound source information and profile used for later-described decomposition. The profile database 50 stores, as described later, profile for each sound source location observed by sounding white noise or the like from various sound source locations. The information about a sound source location assumed by the sound source localization part 20 is also stored.

The delay and sum unit 31 delays voice data inputted at the voice input part 10 by preset predetermined delay time to add them together. In FIG. 3, a plurality of delay and sum units 31 are described for respective set delay times (minimum delay time, . . . , $-\Delta\theta$, 0, $+\Delta\theta$, . . . , maximum delay time). For example, if a distance between the microphones in the microphone array 111 is constant, and delay time is $+\Delta\theta$, voice data recorded in an n-th microphone is delayed by $(n-1)$ [multiplied by] $\Delta\theta$. Then, a number N of voice data is similarly delayed, and added up. This process is carried out for the preset delay times ranging from the minimum delay time to the maximum delay time. The delay time corresponds to a direction of setting directional characteristics of the microphone array 111. Thus, an output of the delay and sum unit 31 is to be a voice data at each stage when the directional characteristics of the microphone array 111 are changed from a minimum angle to a maximum angle stepwise. The voice data outputted from the delay and sum unit 31 is transferred to the Fourier transformation unit 32.

The Fourier transformation unit 32 transforms voice data of a time domain of each short-time voice frame to Fourier transformation to be converted into voice data of a frequency domain. Further, the voice data of the frequency domain is converted into a voice power distribution (power spectrum) of each frequency band. In FIG. 3, a plurality of Fourier transformation units 32 are described corresponding to the delay and sum units 31.

The Fourier transformation unit 32 outputs a voice power distribution of each frequency band for each angle of setting directional characteristics of the microphone array 111, in other words, for each output of each delay and sum unit 31 described in FIG. 3. The voice power distribution data outputted from the Fourier transformation unit 32 is organized for respective frequency bands to be transferred to the profile fitting unit 33.

Figure 4:
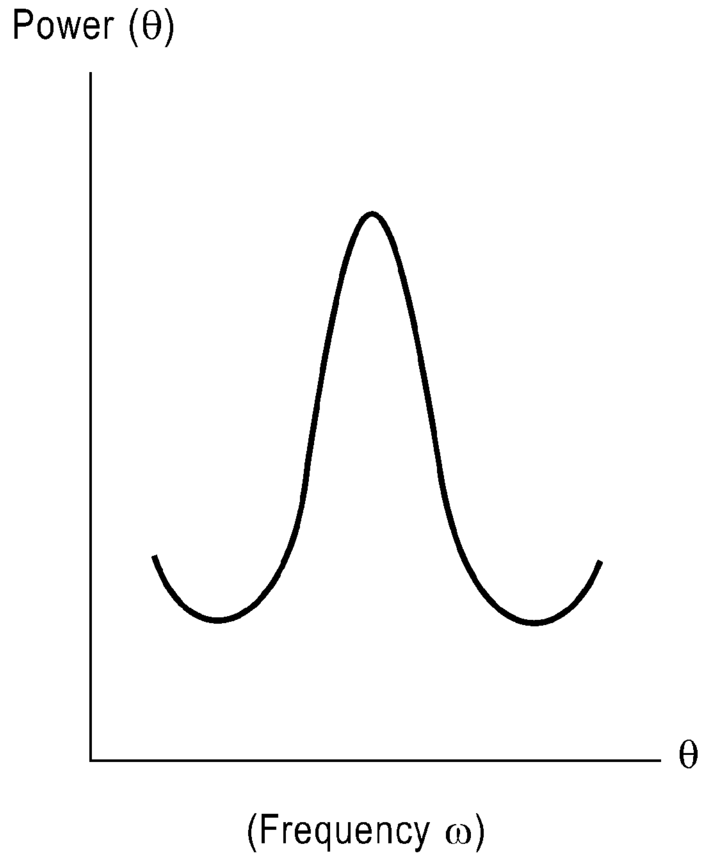
FIG. 4 is a graph showing an example of a voice power distribution used in the first embodiment.

FIG. 4 shows an example of a voice power distribution transferred to the profile fitting unit 33.

The profile fitting unit 33 executes approximately a decomposition of the data of the voice power distribution received for each frequency band of the Fourier transformation unit 32 (hereinafter, this voice power distribution of each angle is referred to as profile) to an existing profile. In FIG. 3, a plurality is described for respective frequency bands. The existing profile used at the profile fitting unit 33 is obtained by selecting profile coincident with the sound source location information assumed by the sound source localization part 20 from the profile database 50.

Now, the decomposition by the profile fitting unit 33 is described more in detail.

First, by using a base form sound such as white noise, for various frequencies (ideally all frequencies) $\omega$ of a range used for speech recognition, profile ($P_\omega(\theta_0,\theta)$ of the microphone array 111 when a directional sound source direction is $\theta_0$: hereinafter, the profile is referred to as directional sound source profile) is obtained beforehand in possible various sound source directions (ideally, all sound source directions)

$\theta_0$. On the other hand, profile ($Q_\omega(\theta)$) for a non-directional background sound is similarly obtained beforehand. These profiles exhibit profiles of the microphone array 111 itself, not acoustic characteristics of noise or a voice.

Then, assuming that an actually observed voice is constituted of a sum of nondirectional background noise and a directional target voice, profile $X_\omega(\theta)$ obtained for the observed voice can be approximated by a sum of respective coefficient multiples of directional sound source profile $P_\omega(\theta_0,\theta)$ for a sound source from a given direction $\theta_0$, and profile $Q_\omega(\theta)$ for a nondirectional background sound.

Figure 5:
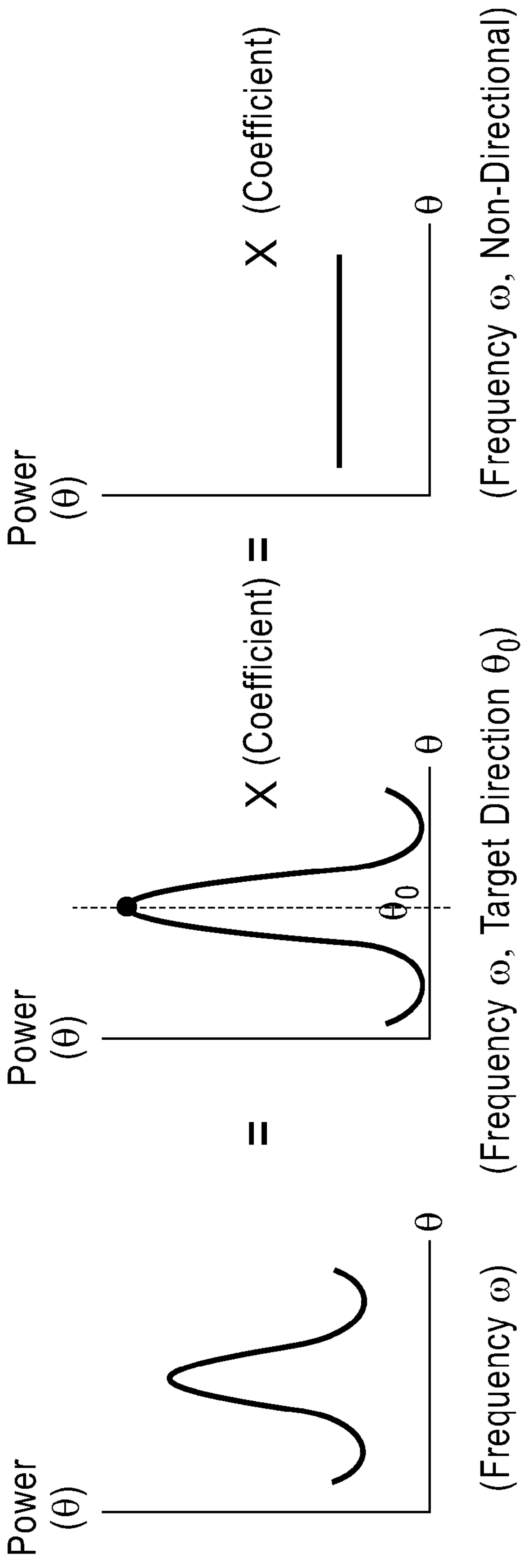
FIG. 5 is a schematic view explaining a relation between premeasured directional sound source profile and profile for a nondirectional background sound, and profile of a recorded voice.

FIG. 5 schematically shows the above relation. The relation can be represented by the following equation 1.

$$X_\omega(\theta)\approx\alpha_\omega\cdot P_\omega(\theta_0,\theta)+\beta_\omega\cdot Q_\omega(\theta) \quad \text{[Equation 1]}$$

Here, $\alpha_\omega$ denotes a weight coefficient of directional sound source profile of a target direction, and $\beta_\omega$ a weight coefficient of nondirectional background sound profile. These coefficients are decided so as to minimize an evaluation function $\Phi_\omega$ represented by the following equation 2.

$$\Phi_\omega = \int_{\min\_\theta}^{\max\_\theta}\{X_\omega(\theta)-a_\omega\cdot P_\omega(\theta_0,\theta)-\beta_\omega\cdot Q_\omega(\theta)\}^2 d\theta \quad \text{[Equation 2]}$$

$\alpha_\omega$ and $\beta_\omega$ for giving the minimum value are obtained by the following equation 3.

$$\frac{\partial\Phi_\omega}{\partial a_\omega}=0,\ \frac{\partial\Phi_\omega}{\partial\beta_\omega}=0 \quad \text{[Equation 3]}$$

However, $\alpha_\omega \geqq 0$ and $\beta_\omega \geqq 0$ must be assured.

After the coefficients have been obtained, a power of only a target sound source including no noise components can be obtained. A power at its frequency $\omega$ is given as $\alpha_\omega\cdot P_\omega(\theta_0,\theta_0)$.

In addition, in an environment of recording a voice, not only background noise of a noise source, but also predetermined noise (directional noise) from a specific direction can be assumed. If its coming direction can be assumed, directional sound source profile for the directional noise is obtained from the profile database 50 to be added as a resolution element of a right side of the equation 1.

Incidentally, profile observed for an actual voice is obtained time-sequentially for respective voice frames (normally, 10 ms to 20 ms). However, in order to obtain stable profile, as a process before decomposition, power distributions of a plurality of voice frames may be averaged en bloc (smoothing of time direction).

As a result, the profile fitting unit 33 assumes a voice power of each frequency $\omega$ of only a target sound source including no noise components to be $\alpha_\omega\cdot P_\omega(\theta_0,\theta_0)$. The assumed voice power of each frequency $\omega$ is transferred to the spectrum reconstruction unit 34.

The spectrum reconstruction unit 34 collects the voice powers of all the frequency bands assumed by the profile fitting unit 33 to structure voice data of a noise component-suppressed frequency domain. If smoothing is carried out at the profile fitting unit 33, at the spectrum reconstruction unit 34, inverse-smoothing for construction as a inverse-filter of smoothing may be carried out to sharpen time fluctuation. Assuming that $Z_\omega$ is a inverse smoothing output (power spectrum), in order to suppress excessive fluctuation in inverse smoothing, a limiter may be incorporated to limit fluctuation to $0\leqq Z_\omega$ and $Z_\omega\leqq X_\omega(\theta_0)$. For this limiter, two types of processes, i.e., a sequential process executing a limit at each state of the inverse filter, and a post process executing a limit after the end of inverse-filtering, are conceivable. From experience, preferably, $0\leqq Z_\omega$ is set for the sequential process, and $Z_\omega\leqq X_\omega(\theta_0)$ for the post process.

Figure 6:
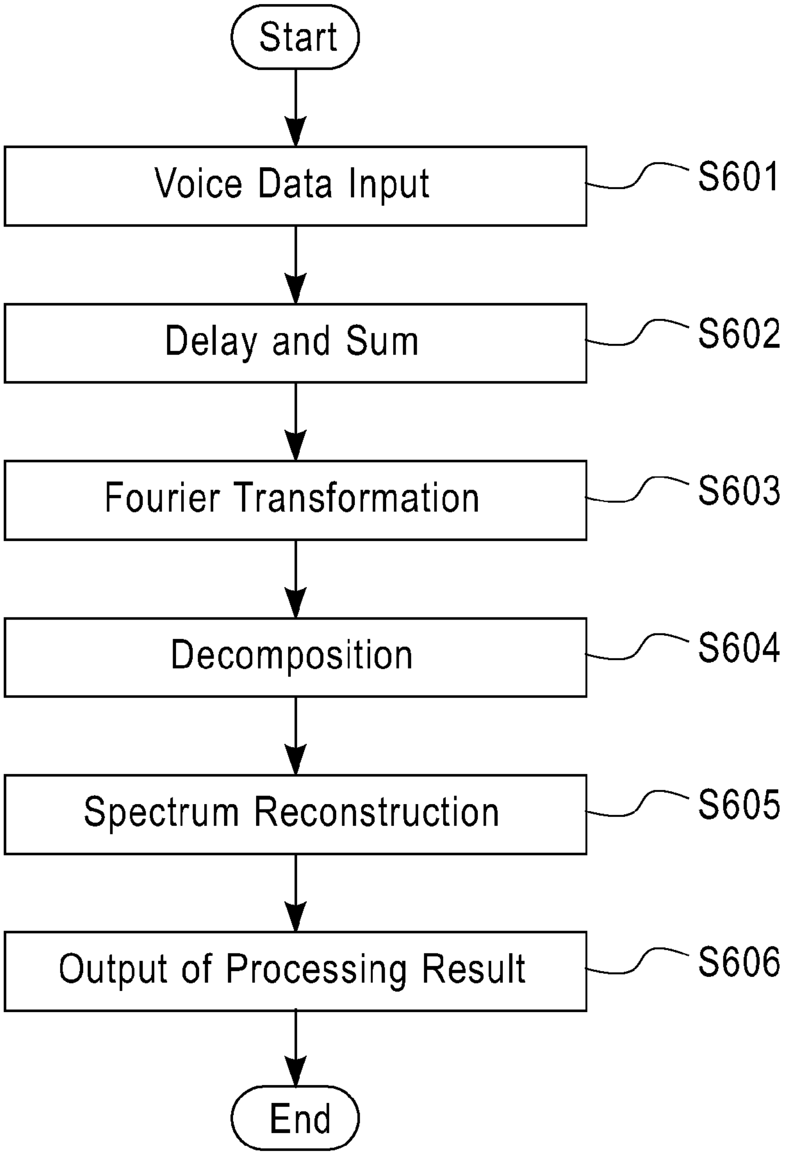
FIG. 6 is a flowchart illustrating a flow of a process at the noise suppression part in the first embodiment.

FIG. 6 is a flowchart illustrating a process at the noise suppression part 30 constituted in the foregoing manner.

Referring to FIG. 6, first, voice data inputted by the voice input part 10 is inputted to the noise suppression part 30 (step 601), and subjected to delay and sum at the delay and sum unit 31 (step 602). Here, it is assumed that pulse coded modulation (PCM) voice data of t-th sampling at an n-th microphone of the microphone array 111 (voice input part 10) constituted of a number N of microphones is stored in a variable s(n, t).

The delay and sum unit 31 represents a delay amount by sampling points. This delay amount is multiplied by a sampling frequency to become actual delay time. Assuming that a minute width of a delay amount to be changed is $\Delta\theta$ sample, and the delay amount is changed to an M steps in each of positive and negative directions, a maximum delay amount becomes M [multiplied by] $\Delta\theta$ sample, and a minimum delay amount becomes −M [multiplied by] $\Delta\theta$ sample. In this case, a delay and sum output of an m-th stage becomes a value represented by the following equation 4.

$$x(m,t)=\sum_{n=1}^{N}s(n,t-(n-1)\cdot\Delta\theta\cdot m) \quad \text{[Equation 4]}$$

In the equation 4, as a voice recording environment, constant microphone inter-spacing, and a far sound field are assumed. Other than this case, based on a publicly known theory of the delay and sum microphone array 111, an m-th delay and sum output when a directional direction is changed to one side by M steps is constituted as x(m, t).

Then, Fourier transformation is carried out by the Fourier transformation unit 32 (step 603).

The Fourier transformation unit 32 cuts up the voice data x(m, t) of the timed domain for each short-time voice frame interval to be converted into voice data of a frequency domain by Fourier transformation. Further, the voice data of the frequency domain is converted into a power distribution $X_{\omega,i}(m)$ for each frequency band. Here, a suffix $\omega$ denotes a representative frequency of each frequency band. The suffix i denotes a number of a voice frame. If a voice frame interval represented by sampling points is frame_size, there is a relation of t=i [multiplied by] frame_size.

The observed profile $X_{\omega,i}(m)$ is transferred to the profile fitting unit 33. However, if time-direction smoothing is carried out as a preprocess at the profile fitting unit 33, the observed profile is to be a value represented by the following equation 5, where profile before smoothing is $X_{\omega,i}{}^*(m)$ and a filter width is W, and a filter coefficient is $C_j$.

$$X_{\omega,i}(m)=\sum_{j=0}^{W-1}c_j\cdot X^*_{\omega,i-j}(m),\ \text{here,}\ \sum_{j=0}^{W-1}c_j=1 \quad \text{[Equation 5]}$$

Then, decomposition is carried out by the profile fitting unit 33 (step 604).

For this process, the observed profile $X_{\omega,i}(m)$ received from the Fourier transformation unit 32, sound source location information $m_0$ assumed by the sound source localization part 20, given directional sound source profile $P_\omega(m_0,m)$ for a sound source from a direction represented by a direction m, and given profile $Q_\omega(m)$ for a nondirectional background sound are inputted to the profile fitting unit 33. Here, similarly to the observed profile, for the given profile, a direction parameter m is set by a sampling point unit of one-side by M steps.

A weight coefficient $\alpha_\omega$ of the directional sound source profile of the target direction, and a coefficient $\beta_\omega$ of the nondirectional background sound profile are obtained by the following equation 6. In the equation, suffixes ω and i are omitted. The process is executed for each frequency band ω and each voice frame i.

$$a = \frac{a_0 \cdot a_3 - a_4 \cdot a_2}{a_0 \cdot a_1 - a_2 \cdot a_2},\ \beta = \frac{a_1 \cdot a_4 - a_3 \cdot a_2}{a_0 \cdot a_1 - a_2 \cdot a_2} \quad \text{[Equation 6]}$$

Here, $$a_0 = \sum_{m=-M}^{+M} \{Q(m)\}^2 \quad a_1 = \sum_{m=-M}^{+M} \{P(m)\}^2 \quad a_2 = \sum_{m=-M}^{+M} \{P(m) \cdot Q(m)\}$$

$$a_3 = \sum_{m=-M}^{+M} \{X(m) \cdot P(m)\} \quad a_4 = \sum_{m=-M}^{+M} \{X(m) \cdot Q(m)\}$$

However, since α and β should not be negative values, the following is assumed:

If $\alpha<0$, $\alpha=0$, $\beta=a_4/a_0$

If $\beta<0$, $\beta=0$, $\alpha=a_3/a_1$

Then, spectrum reconstruction is carried out by the spectrum reconstruction unit 34 (step 605).

The spectrum reconstruction unit 34 obtains voice output data $Z_{\omega,i}$ of a noise-suppressed frequency domain based on a result of decomposition by the profile fitting unit 33 in the following manner.

First, if no smoothing is executed at the profile fitting unit 33, there is a relation of $Z_{\omega,i}=Y_{\omega,i}$, directly. Here, $Y_{\omega,i}=\alpha_{\omega,i}\cdot P_{\omega,i}(m_0,m_0)$ On the other hand, if smoothing is executed at the profile fitting unit 33, inverse smoothing accompanying a fluctuation limit represented by the following equation 7 is executed to obtain $Z_{\omega,i}$.

$$Y^*_{\omega,i} = \max\left(0, \frac{1}{c_0}\left\{Y_{\omega,i} - \sum_{j=1}^{W-1} c_j \cdot Y^*_{\omega,i-j}\right\}\right) \quad \text{[Equation 7]}$$

$$Z_{\omega,i} = \min(Y^*_{\omega,i}, X_{\omega,i}(m_0))$$

This voice output data $Z_{\omega,i}$ is outputted as a processing result to the speech recognition part 40 (step 606).

At the above-described noise suppression part 30, the voice data of the time domain is inputted to execute the process. However, voice data of a frequency domain can be executed to process as an input.

Figure 7:
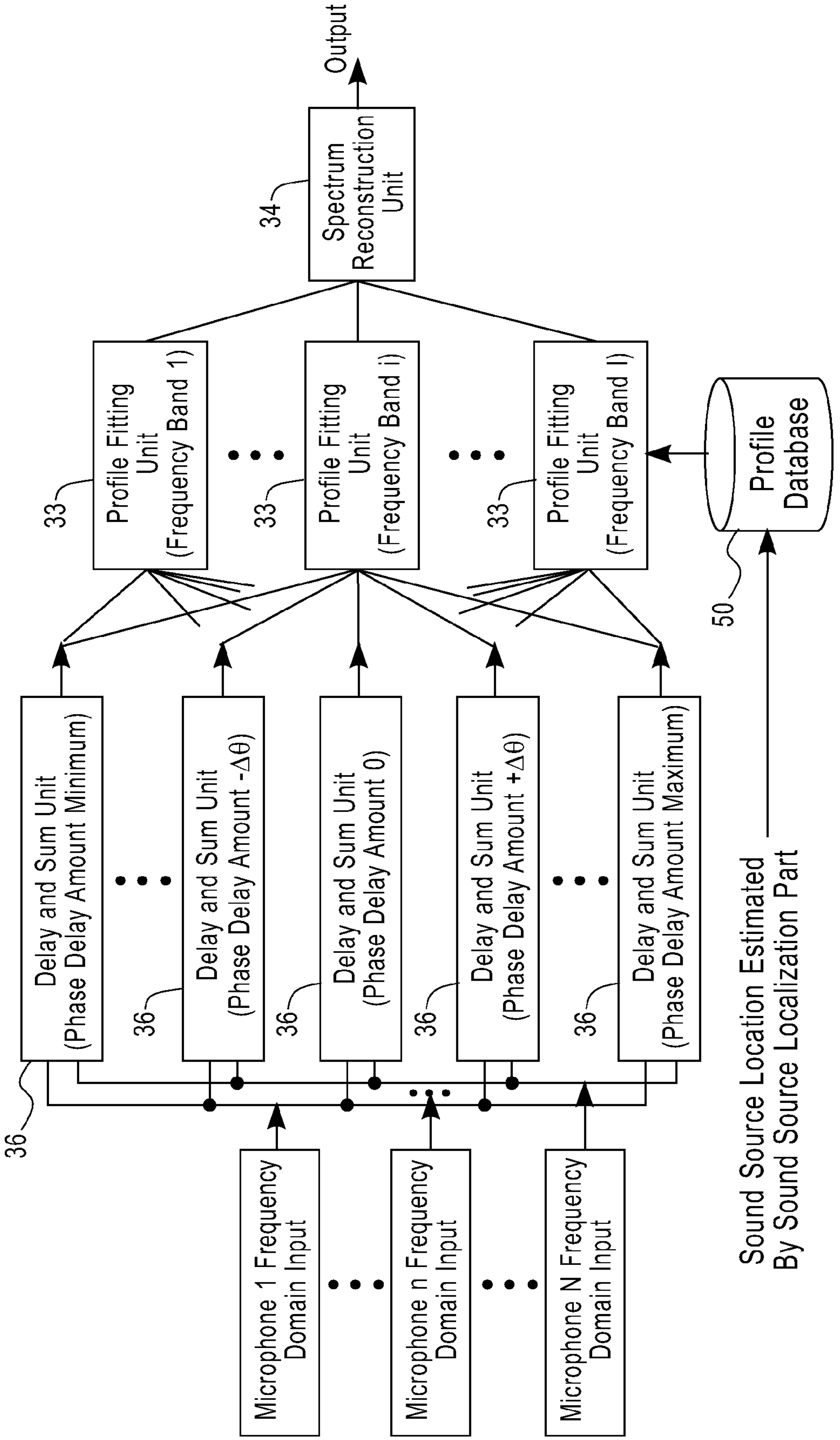
FIG. 7 is a diagram showing a configuration of the noise suppression part when voice data of a frequency domain is an input.

FIG. 7 shows a configuration of the noise suppression part 30 using voice data of a frequency domain as an input.

As shown in FIG. 7, in this case, in place of the delay and sum unit 31 for executing the process in the time domain shown in FIG. 2, a delay and sum unit 36 for executing a process in a frequency domain is arranged in the noise suppression part 30. Since the process in the frequency domain is executed at the delay and sum unit 36, the Fourier transformation unit 32 results in unnecessary.

The delay and sum unit 36 receives voice data in a frequency domain, and delays the voice data by a given predetermined phase delay amount to add them up. In FIG. 7, a plurality of delay and sum units is described for respective preset phase delay amounts (minimum phase delay amount . . . , −Δθ, 0, +Δθ, . . . , maximum phase delay amount). For example, if distances between the microphones in the microphone array 111 are constant and a phase delay amount is +Δθ, a phase of voice data recorded by an n-th microphone is delayed by (n−1) [multiplied by] Δθ. Then, a number N of voice data is similarly delayed to be added up. This process is executed for each of preset phase delay amounts from the minimum delay amount to the maximum delay amount. This phase delay amount corresponds to a direction of directional characteristics of the microphone array 111. Therefore, similarly to the case of the configuration shown in FIG. 3, an output of the delay and sum unit 36 comes to be voice data at each stage when directional characteristics of the microphone array 111 are changed stepwise from a minimum angle to a maximum angle.

The delay and sum unit 36 outputs a voice power distribution of each frequency band for each angle of directional characteristics. This output is organized for each frequency band to be transferred to the profile fitting unit 33. Thereafter, a process at the profile fitting unit 33 and the spectrum reconstruction unit 34 is similar to those in the case of the noise suppression part 30 shown in FIG. 3.

Next, the sound source localization part 20 of the embodiment is described.

Figure 8:
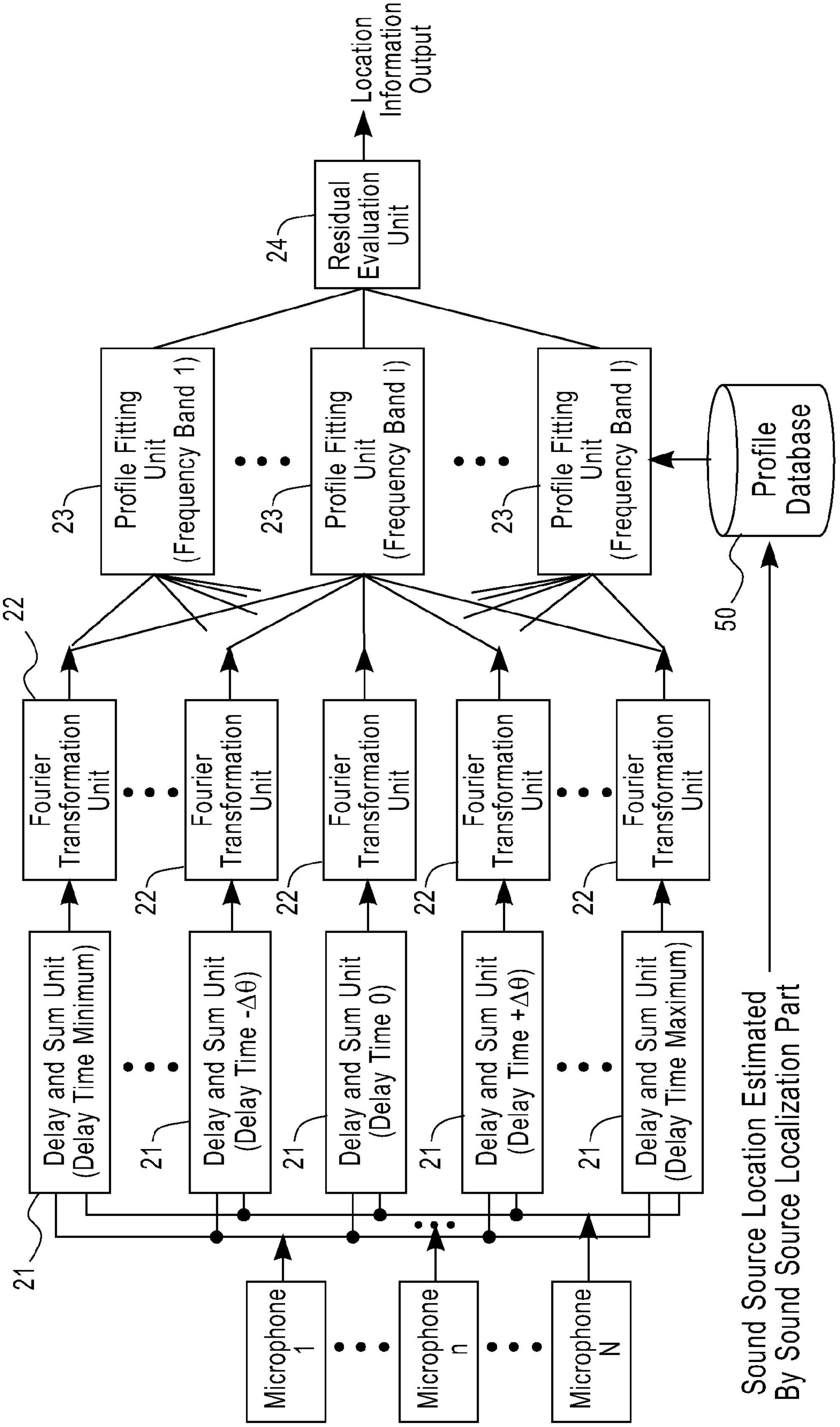
FIG. 8 is a diagram showing a configuration of a sound source localization part in the speech recognition system of the first embodiment.

FIG. 8 shows a configuration of the sound source localization part 20 in the speech recognition system of the embodiment.

Referring to FIG. 8, the sound source localization part 20 is provided with a delay and sum unit 21, Fourier transformation unit 22, a profile fitting unit 23, and a residual evaluation unit 24. The profile fitting unit 23 is connected to the profile database 50. Among these components in the configuration, functions of the delay and sum unit 21 and the Fourier transformation unit 22 are similar to those of the delay and sum unit 31 and the Fourier transformation unit 32 in the noise suppression part 30 shown in FIG. 3. In addition, the profile database 50 stores, for each sound source location, profile observed by sounding white noise or the like from various sound source locations.

The profile fitting unit 23 averages voice power distributions transferred from the Fourier transformation part 22 within a short time to generate a profile observation value for each frequency. Then, the obtained observation value is approximately executed a decomposition to given profile. In this case, as directional sound source profile $P_\omega(\theta_0,\theta)$ all directional sound source profiles stored in the profile database 50 are sequentially selected to be applied and, by the above-described method mainly based on the equation 2, coefficients $\alpha_\omega$, and $\beta_\omega$ are obtained. After the coefficients $\alpha_\omega$, and $\beta_\omega$ are obtained, a residual of an evaluation function $\Phi_\omega$ can be obtained by substitution of the coefficients into the equation 2. The obtained residual of the evaluation function $\Phi_\omega$ for each frequency band ω is transferred to the residual evaluation unit 24.

The residual evaluation unit 24 sums up the residuals of the evaluation function $\Phi_\omega$ of the respective frequency bands ω received from the profile fitting unit 23. In this case, in order to enhance accuracy of the sound source localization, the residuals may be summed up incorporating weight in a high frequency band. Given directional sound source profile selected at the time when the total residual becomes minimum represents an assumed sound source location. That is, a sound source location at the time when the given directional sound source profile is determined is a sound source location to be assumed here.

Figure 9:
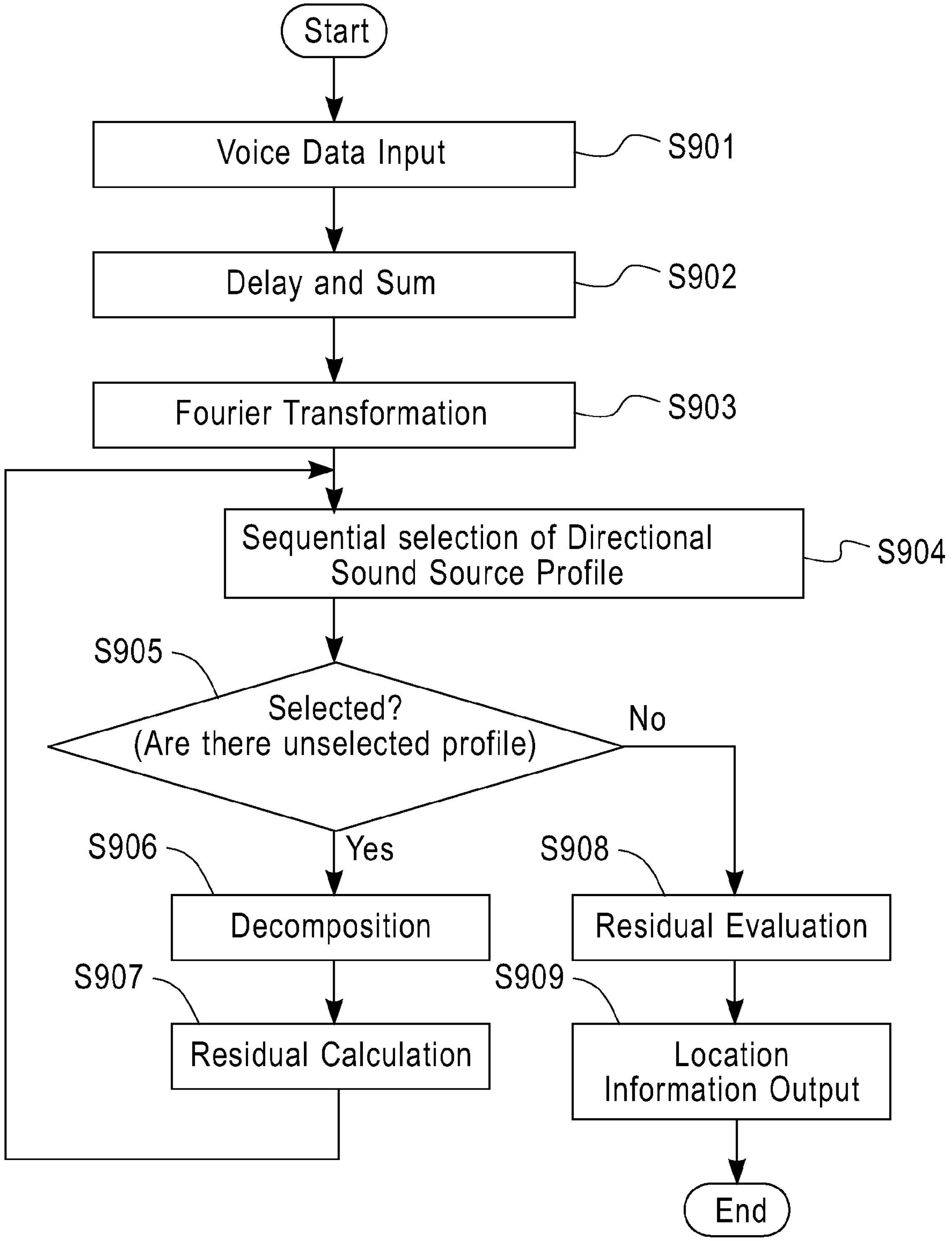
FIG. 9 is a flowchart illustrating a flow of a process at the sound source localization part in the first embodiment.

FIG. 9 is a flowchart illustrating a flow of a process at the sound source localization part 20 constituted in the foregoing manner.

Referring to FIG. 9, first, voice data inputted by the voice input part 10 is inputted to the sound source localization part 20 (step 901), and delay and sum by the delay and sum unit 21, and Fourier transformation by the Fourier transformation unit 22 are executed (steps 902, and 903). These processes are similar to the inputting of the voice data (step 601), the delay and sum (step 602), and the Fourier transformation (step 603) described above with reference to FIG. Thus, description thereof is omitted.

Then, a process by the profile fitting unit 23 is executed.

The profile fitting unit 23 first selects, as given directional sound source profile used for decomposition, different profile sequentially from the given directional sound source profiles stored in the profile database 50 (step 904). Specifically, the operation corresponds to changing of $m_0$ of the given directional sound source profile $P_\omega(m_0,m)$ for a sound source from a direction $m_0$. Then, decomposition is executed for the selected given directional sound source profile (steps 905, and 906).

In the decomposition process by the profile fitting unit 23, by a process similar to the decomposition (step 604) described above with reference to FIG. 6, a weight coefficient $\alpha_\omega$ of directional sound source profile of a target direction, and a weight coefficient $\beta_\omega$ of nondirectional background sound profile are obtained. Then, by using the obtained coefficients $\alpha_\omega$ and $\beta_\omega$ of the directional sound source profile of the target direction and the nondirectional background sound profile, a residual of an evaluation function is obtained by the following equation 8 (step 907).

$$\Phi_\omega = \sum_{m=-M}^{+M} \{X_\omega(m) - a_\omega \cdot P_\omega(m_0, m) - \beta_\omega \cdot Q_\omega(m)\}^2 \quad \text{[Equation 8]}$$

This residual is associated with the currently selected given directional sound source profile to be stored in the profile database 50.

The process from step 904 to step 907 is repeated and, after all the given directional sound source profiles stored in the profile database 50 are tried, then, residual evaluation is executed by the residual evaluation unit 24 (steps 905, and 908).

Specifically, by the following equation 9, residuals stored in the profile database 50 are given weights for respective frequency bands to be summed up.

$$\Phi_{ALL} = \sum_{\omega} C(\omega) \cdot \Phi_\omega \quad \text{[Equation 9]}$$

Here, $C(\omega)$ denotes a weight coefficient, and simply can be all 1.

Then, given directional sound source profile for minimizing $\Phi_{ALL}$ is selected, and outputted as location information (step 909).

As described above, since the functions of the noise suppression part 30 and the sound source localization part 20 are independent each other, when configuring the speech recognition system, both may be configured according to the above-described embodiment, or one of them may be a component according to the embodiment while a conventional technology may be used for the other.

If either one of the functions is a component according to the embodiment, for example in the case of using the above-described suppression part 30, a recorded vice is resolved into a component of a sound from a sound source and a component of a sound by background noise to extract a sound component from the sound source, and recognition is executed by the speech recognition part 40, whereby accuracy of speech recognition can be enhanced.

In the case of using the sound source localization part 20 of the embodiment, profile of a sound from a specific sound source location is compared with profile of a recorded voice considering background noise, whereby accurate assumption of a sound source location can be executed.

Further, in the case of using both of the sound source localization part 20 and the noise suppression part 30 of the embodiment, the process is efficient because not only accurate sound source location assumption and enhancement in accuracy of speech recognition can be expected but also the profile database 50, the delay and sum units 21, 31, and the Fourier transformation units 22, 32 can be shared to be used.

Even in an environment existing a distance between the speaker and the microphone, noise is efficiently canceled to contribute to realization of highly accurate speech recognition. Therefore, the speech recognition system of the embodiment can be used in many voice input environments such as voice inputting to a computer, a PDA, and electronic information equipment such as a cell phone, and voice interaction with a robot and other mechanical apparatus, and the like.

Second Embodiment

According to a second embodiment, targeting a case where a lager observation error such as effects of aliasing is inevitably included in a recorded voice, voice data is modeled to execute maximum likelihood estimation, whereby noise is reduced.

Prior to description of a configuration and an operation of the embodiment, a subject about aliasing is specifically described.

Figure 17:
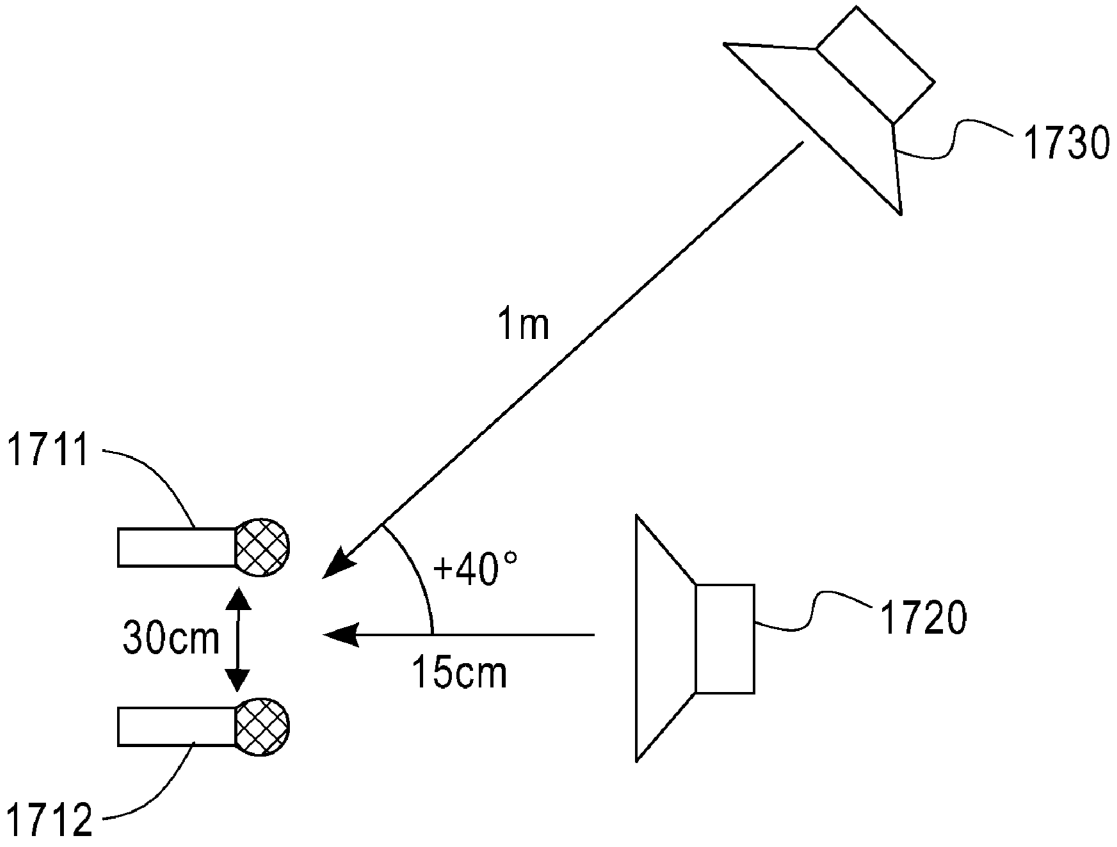
FIG. 17 is an explanatory diagram showing an aliasing occurrence situation in a 2-channel microphone array.
Figure 18:
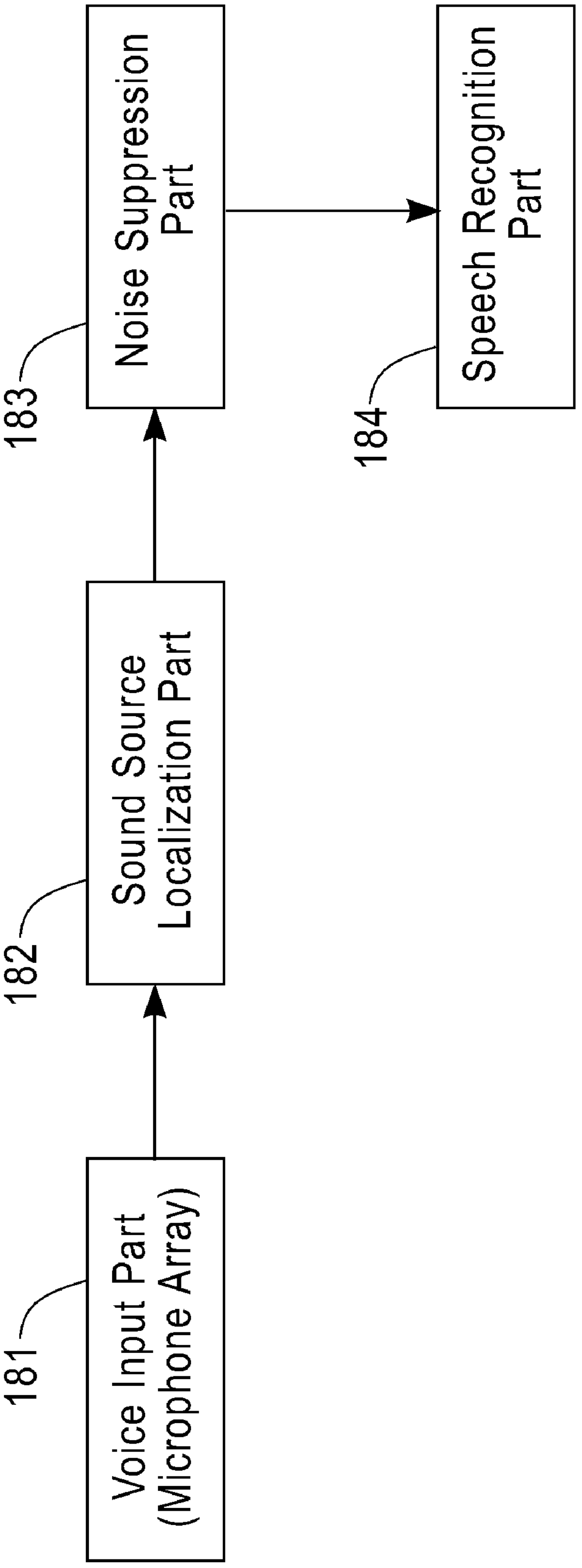
FIG. 18 is a schematic diagram showing a configuration of a conventional speech recognition system using a microphone array.

FIG. 17 illustrates an aliasing occurrence situation in a 2-channel microphone array.

Suppose a case where, as shown in FIG. 17, two microphones 1711, 1712 are arranged at a spacing of about 30 cm, a signal sound source 1720 is arranged to the front by 0 degrees, and one noise source 1730 is arranged to the right by about 40 degrees. In this case, assuming a 2-channel spectral subtraction method as a beam former to be used, ideally, on a main-beam former, sound waves of the signal sound source 1720 are set in-phase to be intensified, while sound waves of the noise source 1730 not reaching the left and right microphones 1711, 1712 simultaneously are not set in-phase to be weakened. On the sub-beam former, sound waves of the signal sound source 1702 are canceled to be added together in inverted phase, and thus almost none is left, while sound waves of the noise source 1730 are not canceled to be left in an output because those not originally set in-phase are added together in inverted phase.

However, at a specific frequency, a different situation may occur. In a constitution similar to that of FIG. 17, sound waves of the noise source 1730 reach the left microphone 1712 late by about 0.5 ms. Accordingly, sound waves of the noise source 1730 of approximately 2000 (=1/0.0005) Hz are set in-phase late accurately by one cycle. That is, the noise component is not weakened on the main beam former, and the noise component that should be undeleted in the output of the sub-beam former is deleted. This phenomenon also occurs at the specific frequency (in this case, harmonic overtones of (2000 Hz) (=N [multiplied by] 2000 Hz). Thus, aliasing (noise) is included in the voice data to be extracted. According to the embodiment, at this specific frequency where aliasing occurs, assumption of a noise component is realized with higher accuracy.

The speech recognition system (apparatus) of the second embodiment is, similarly to the first embodiment, realized by a computer apparatus similar to that shown in FIG. 1.

Figure 10:
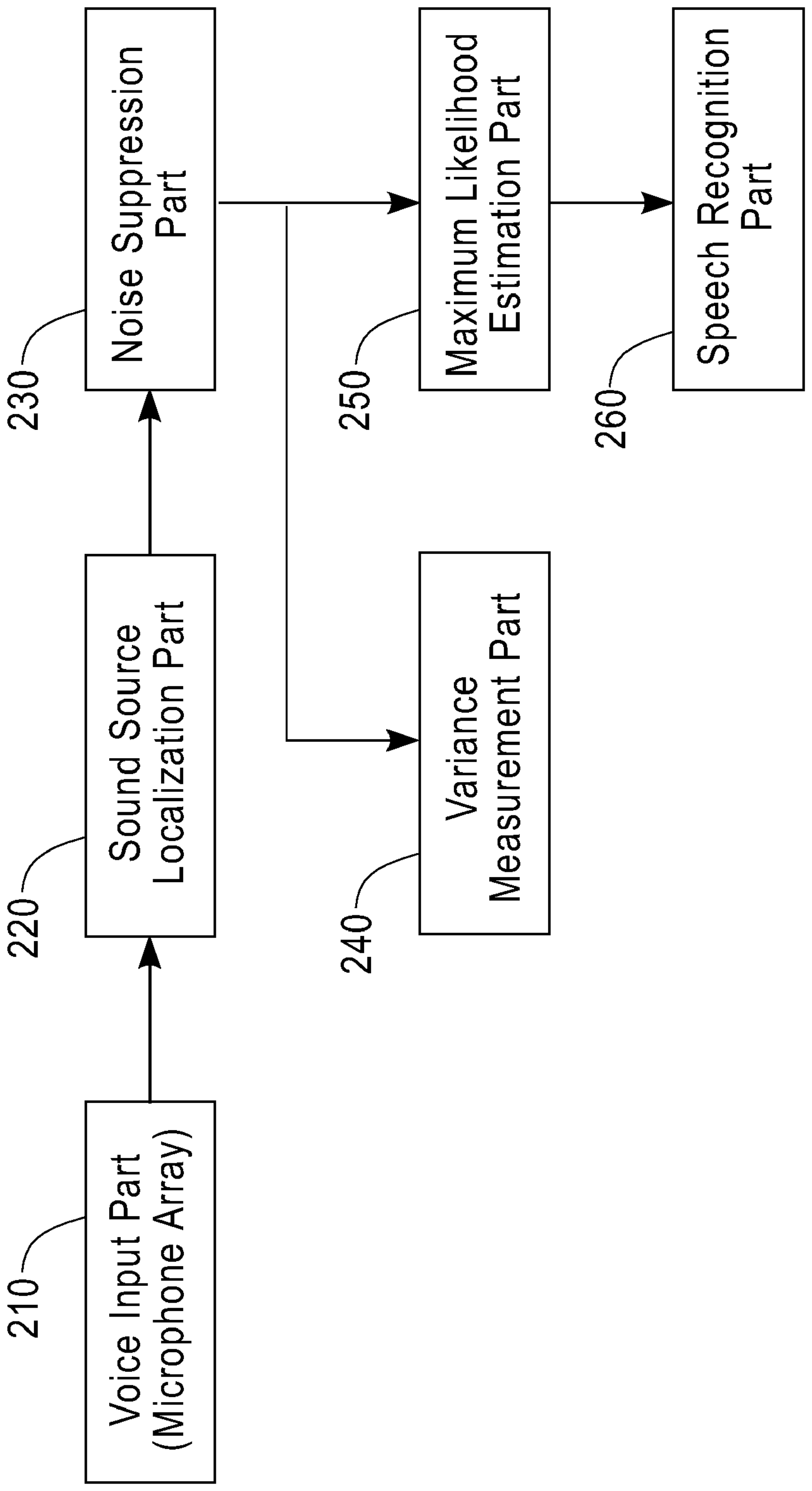
FIG. 10 is a diagram showing a configuration of a speech recognition system of a second embodiment.

FIG. 10 shows a configuration of the speech recognition system concerning to the embodiment.

As shown in FIG. 10, the speech recognition system of the embodiment is provided with a voice input part 210, a sound source localization part 220, a noise suppression part 230, a variance measurement part 240, a maximum likelihood estimation part 250, and a speech recognition part 260.

According to the above configuration, the sound source localization part 220, the noise suppression part 230, the variance measurement part 240, the maximum likelihood estimation part 250, and the speech recognition part 260 constitute a virtual software block realized by controlling a CPU 101 based on a program deployed in the main memory 103 of FIG. 1. The program for controlling the CPU 101 to realize such functions can be provided by being stored in a magnetic disk, an optical disk, a semiconductor memory or other storage media to be distributed, and delivered through a network. In the embodiment, the program is inputted through the network interface 106 and the floppy disk drive 108 shown in FIG. 1, a not-shown CD-ROM Drive, or the like, to be stored in a hard disk 105. Then, the program stored in the hard disk 105 is read into the main memory 103 to be deployed, and executed by the CPU 101 to realize the function of each component shown in FIG. 10. Transfer of data between the components realized by the program-controlled CPU 101 is carried out through a cache memory of the CPU 101 or the main memory 103.

The voice input part 210 is realized by a microphone array 111 constituted of a number N of microphones, and a sound card 110 to record a voice. The recorded voice is converted into electric voice data to be transferred to the sound source localization part 220. Since a problem of aliasing becomes conspicuous when there are two microphones, description is made assuming that the voice input part 10 is provided with two microphones (i.e., two voice data are recorded).

The sound source localization part 220 assumes a sound source location (sound source direction) of a target voice from two voice data simultaneously recorded by the voice input part 210. Sound source location information assumed by the sound source localization part 220, and the two voice data obtained from the voice input part 210 are transferred to the noise suppression part 230.

The noise suppression part 230 is a beam former of a type for assuming and subtracting a predetermined noise component in the recorded voice. That is, the noise suppression part 230 outputs one voice data having noise of a sound from a sound source location other than that of the target voice canceled as much as possible (noise suppression) by using the sound source location information and the two voice data received from the sound source localization part 220. As a type of a beam former, a beam former for canceling a noise component by the profile fitting of the first embodiment, or a beam former for canceling a noise component by a conventionally used 2-channel spectral subtraction may be used. Noise-suppressed voice data is transferred to the variance measurement part 240 and the maximum likelihood estimation part 250.

The variance measurement part 240 is inputted the voice data processed at the noise suppression part 230, and measures observation error variance if the noise-suppressed input voice is in a noise section (section of no target voices in a voice frame). If the input voice is in a voice section (section of a target voice in a voice frame), the variance measurement part 240 measures modeling error variance. The observation error variance, the modeling error variance, and their measurement methods will be described in detail later.

The maximum likelihood estimation part 250 is inputted the observation error variance and the modeling error variance from the variance measurement part 240, and the voice data processed at the noise suppression part 230 to calculate a maximum likelihood estimation part. The maximum likelihood estimation value and its calculation method will be described in detail later. The calculated maximum likelihood estimation value is transferred to the speech recognition part 260.

The speech recognition part 260 converts the voice into a text by using the maximum likelihood estimation value calculated by the maximum likelihood estimation part 250, and outputs the text.

In the embodiment, a power value (power spectrum) in a frequency domain is assumed for transfer of voice data between the components.

Next, description is made of a method for reducing effects of aliasing for the recorded voice according to the embodiment.

The output of the beam former of a type for assuming a noise component to execute spectral subtraction, such as the profile fitting method of the first embodiment, and the conventionally used 2-channel spectral subtraction method, includes an error of large variance of an average 0 in a time direction mainly around a power of a specific frequency where a problem of aliasing occurs. Thus, for a predetermined voice frame, a solution made of averaged signal powers among adjacent sub-band in frequency direction is considered. This solution is called a smoothing solution. Since spectrum envelope of a voice is expected to be continuously changed, by such averaging in the frequency direction, mixed errors can be expectedly averaged to be reduced.

However, since the smoothing solution has a nature of dull spectral distribution from the above definition, a spectrum structure is not represented accurately. That is, even if the smoothing solution itself is used for speech recognition, a good speech recognition result cannot be obtained.

Therefore, according to the embodiment, linear interpolation is considered for an observation value of the noise-suppressed input voice and the smoothing solution. A value near the observation value is used at a frequency with a small observation error, and a value near the smoothing solution is used at a frequency with a large observation error. A value assumed as a value to be used is a maximum likelihood estimation value. Thus, as the maximum likelihood estimation value, in the case of high S/N (ratio of signal and noise) including almost no noise in a signal, a value very near the observation value is used in almost all frequency domains. In the case of low S/N including much noise, a value near the smoothing solution is used around a specific frequency where aliasing occurs.

Hereinafter, a specific content of a process for calculating the maximum likelihood estimation value is formulated.

In order to prepare for inevitable observation errors when a predetermined target is observed, the observation target is modeled in a certain form to execute maximum likelihood estimation. According to the embodiment, by using the property that “spectrum envelope is changed continuously” as a voice model of the observation target, a smoothing solution of a spectrum frequency direction is defined.

A state equation is set as the following equation 10.

$$S(\omega,T)=\bar{S}(\omega,T)+Y(\omega,T) \quad \text{[Equation 10]}$$

(hereinafter, $\bar{S}$ is also described as $S^-$).

Here, $S^-$ denotes a smoothing solution averaging powers S of a target voice included in the main beam former among adjacent sub-band points. Y denotes an error from the smoothing solution, which is called a modeling error. Also, ω denotes a frequency, and T a time-sequential number of a voice frame.

If an output (power spectrum) of a beam former as an observation value is Z, an observation equation is defined as the following equation 11.

$$Z(\omega,T)=S(\omega,T)+V(\omega,T) \quad \text{[Equation 11]}$$

Here, V denotes an observation error. This observation error is large at a frequency where aliasing occurs. After an observation error Z is obtained, a conditional probability distribution P(S|Z) at a power S of a target voice is represented by the following equation 12 based on Bayes’ formula.

$$P(S|Z)=P(Z|S)\cdot P(S)/P(Z) \quad \text{[Equation 12]}$$

In this case, an assumption value $S^-$ by a model is used if the observation error V is large, and the observation value Z itself is used if the observation error V is small, whereby reasonable assumption is made.

Such a maximum likelihood estimation value of S is obtained by the following equations 13 to 16/

$$\hat{S}(\omega,T)=S\bar{S}(\omega,T)+(p(\omega,T)/r(\omega,T))\cdot\{Z(\omega,T)-\bar{S}(\omega,T)\} \quad \text{[Equation 13]}$$

(hereinafter, $\hat{S}$ is also described as S^)

$$p(\omega,T)=(q(\omega,T)^{-1}+r(\omega,T)^{-1})^{-1} \quad \text{[Equation 14]}$$

$$q(\omega,T)=E[\{Y(\omega_i,T_j)\}^2]_{\omega,T} \quad \text{[Equation 15]}$$

$$r(\omega,T)=E[\{V(\omega_i,T_j)\}^2]_{\omega,T} \quad \text{[Equation 16]}$$

Figure 11:
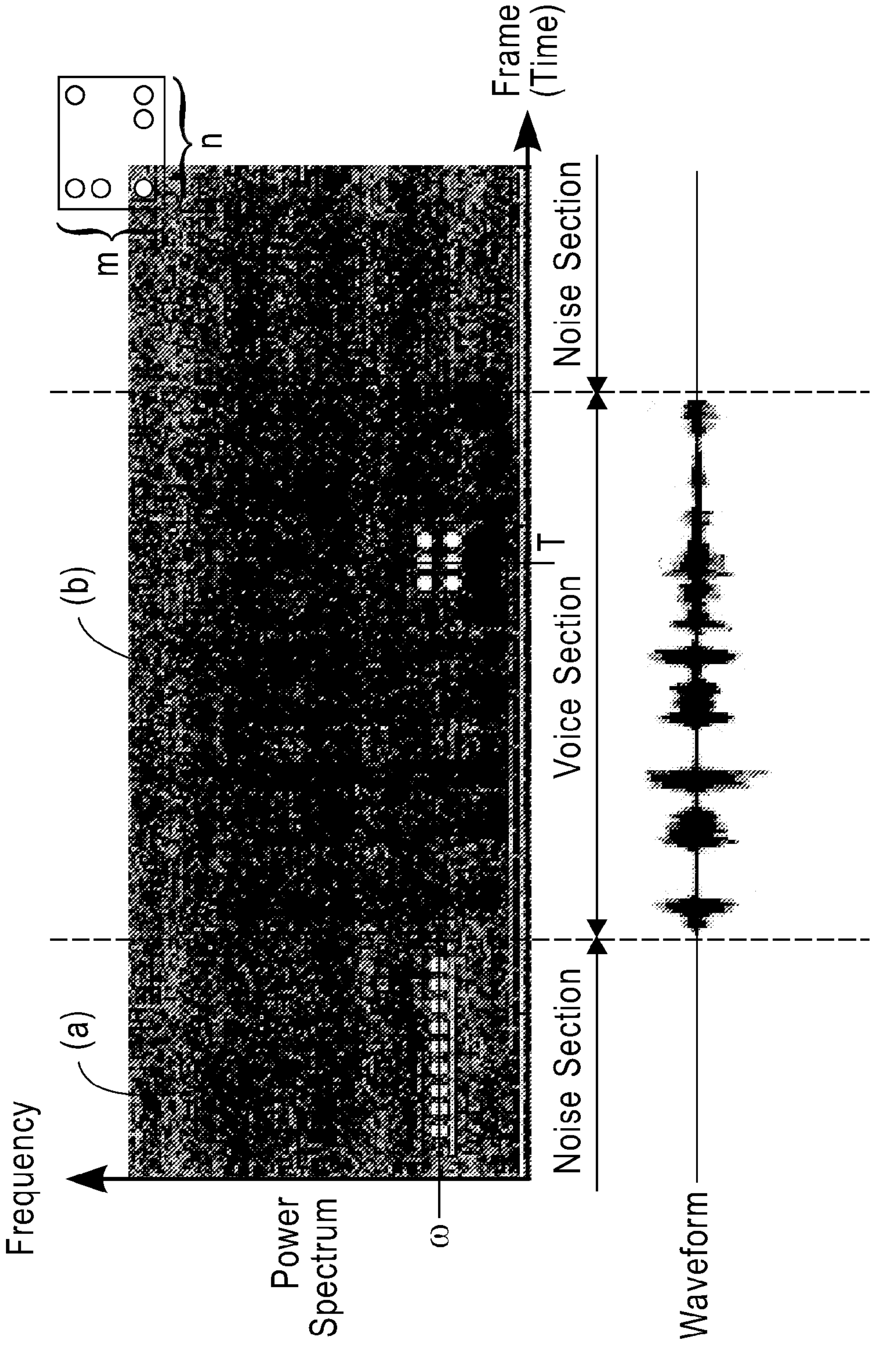
FIG. 11 is a diagram explaining an example of a range of variance measurement according to the second embodiment.

Here, q denotes variance of a modeling error Y, and r variance of an observation error V. In the equations 15, 16, average values of Y, V are assumed to be 0. Here, as shown in FIG. 11 showing a range of variance measurement, $E[\ ]_{\omega,T}$ represents an operation of taking an expected value of m [multiplied by] n points around ω, T. The letters $\omega_i$ and $T_j$ represent point in m [multiplied by] n points.

In the equation 13, the smoothing solution $S^-$ is not directly obtained. However, a smoothing solution $V^-$ of the observation error V is assumed to take a value near 0 by averaging, and a smoothing solution $Z^-$ of the observation value Z is used instead as shown in the following equation 17.

$$\bar{Z}(\omega,T)=\bar{S}(\omega,T)-\bar{V}(\omega,T)\approx\bar{S}(\omega,T) \quad \text{[Equation 17]}$$

For the observation error variance r, first, a stationary nature is assumed to set r(ω). As a power S of a target voice is 0 in the noise section, by observing the observation value Z, the above can be obtained from the equations 11, and 16. In this case, a range of an operation of measuring variance becomes similar to a range (a) of FIG. 11.

For the modeling error variance q, as the modeling error Y cannot be directly observed, assumption is made by observing f given in the following equation 18.

$$\begin{aligned} f(\omega,T) &= E\left[\{Z(\omega_i,T_j)-\bar{Z}(\omega_i,T_j)\}^2\right]_{\omega,T} \\ &\approx E[\{Y(\omega_i,T_j)+V(\omega_i,T_j)\}^2]_{\omega,T} \\ &\approx E[\{Y(\omega_i,T_j)\}^2]_{\omega,T}+E[\{V(\omega_i,T_j)\}^2]_{\omega,T} \\ &= q(\omega,T)+r(\omega) \end{aligned} \quad \text{[Equation 18]}$$

Here, it is assumed that there is no correlation between the modeling error Y and the observation error V. As the observation error variance r has been obtained, by observing f in the voice section, modeling error variance q can be obtained from the equation 18. In this case, a range of an operation of measuring variance is similar to a range (b) shown in FIG. 11.

According to the embodiment, the foregoing process is executed by the variance measurement part 240 and the maximum likelihood estimation part 250.

Figure 12:
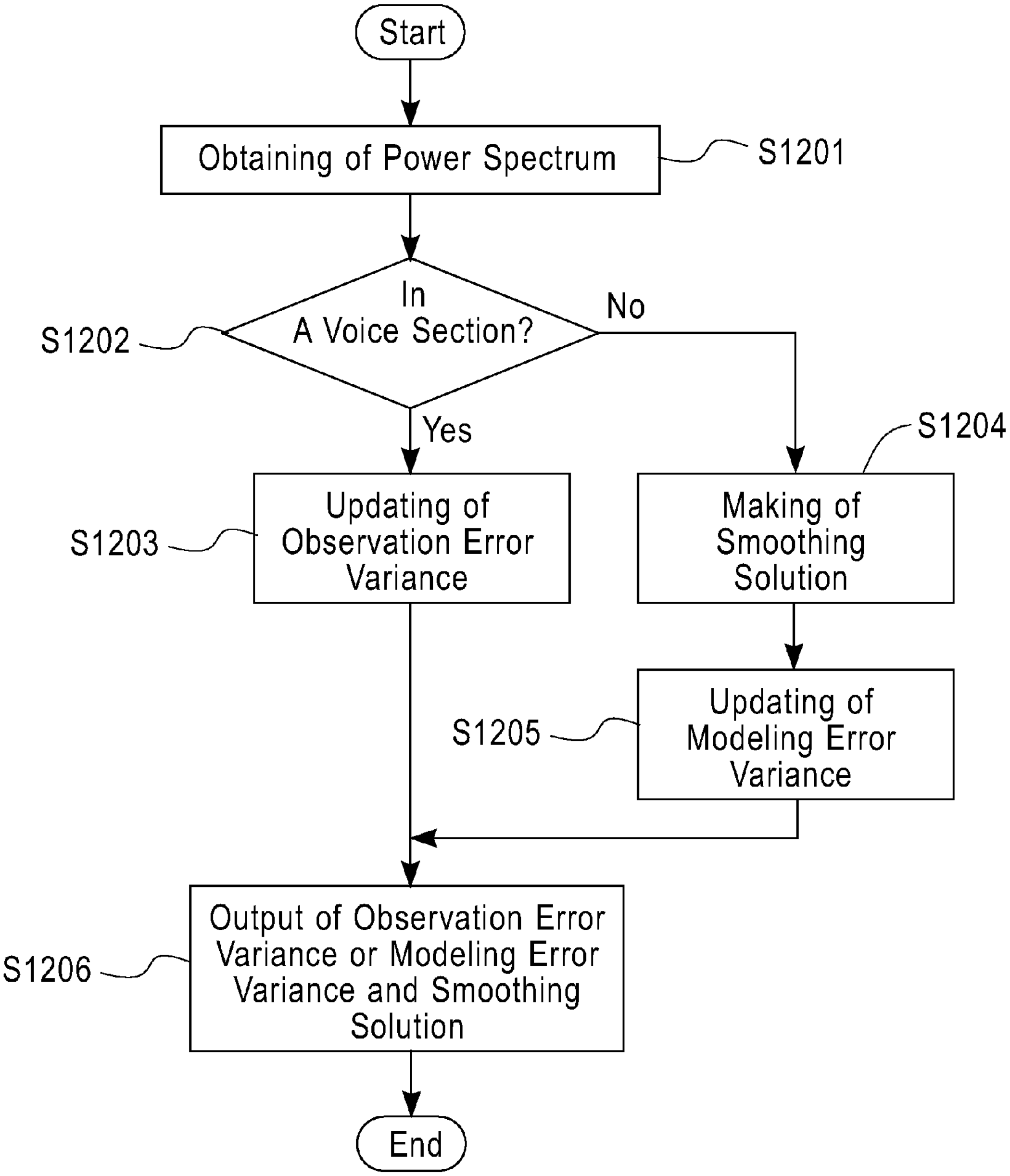
FIG. 12 is a flowchart illustrating an operation of a variance measurement part in the second embodiment.

FIG. 12 is a flowchart illustrating an operation of the variance measurement part 240.

As shown in FIG. 12, after obtaining a power spectrum Z(ω,T) after noise suppression of a voice frame T from the noise suppression part 230 (step 1201), the variance measurement part 240 determines whether the voice frame T belongs to the voice section or to the noise section (step 1202). Determination for the voice frame T can be made by using a conventionally known method.

If the inputted voice frame T belongs to the noise section, the variance measurement part 240 refers the observation error variance r(ω) to past history to execute recalculation (updating) according to the equations 11, 16 (step 1203).

On the other hand, if the inputted voice frame T belongs to the voice section, the variance measurement part 240 first makes a smoothing solution $S^-(\omega,T)$ from the power spectrum Z(ω, T) as the observation value by the equation 17 (step 1204). Then, by the equation 18, the modeling error variance q(ω, T) is recalculated (updated). The updated observation error variance r(ω), or the updated modeling error variance q(ω,T), and the prepared smoothing solution $S^-(\omega, T)$ are transferred to the maximum likelihood estimation part 250 (step 1206).

Figure 13:
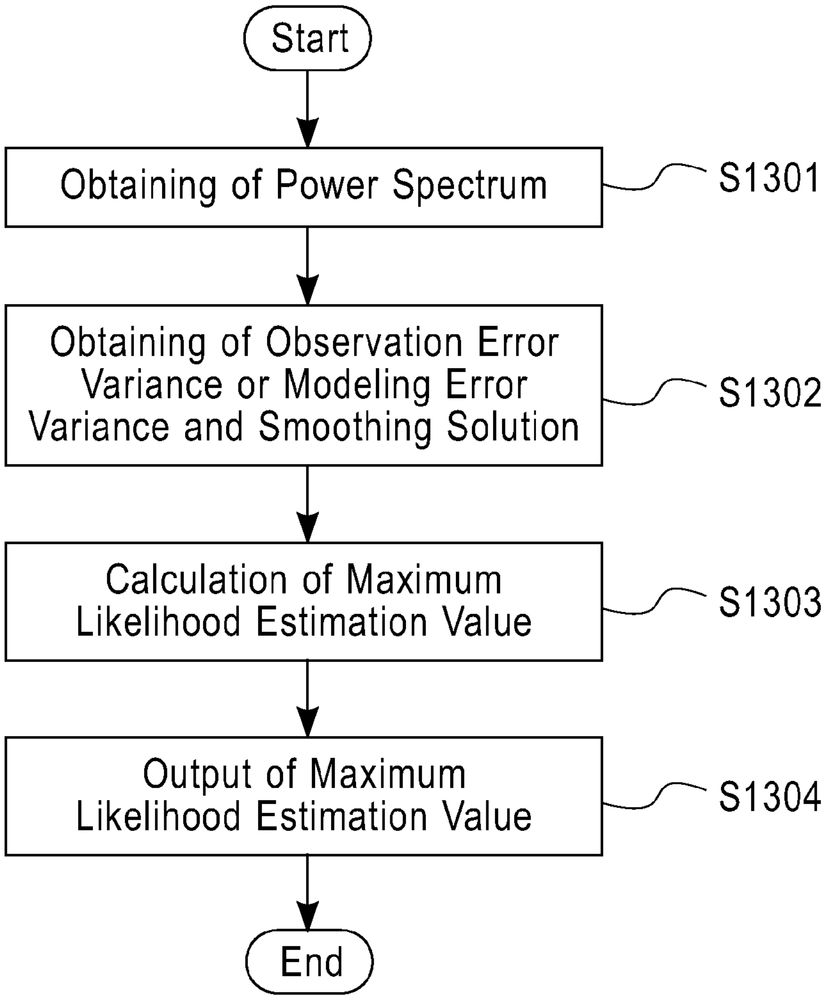
FIG. 13 is a flowchart illustrating an operation of a maximum likelihood estimation part 250 in the second embodiment.

FIG. 13 is a flowchart illustrating an operation of the maximum likelihood estimation part 250.

As shown in FIG. 13, the maximum likelihood estimation part 250 obtains a power spectrum Z(ω, T) after noise suppression of the voice frame T from the noise suppression part 230 (step 1301), and observation error variance r(ω), modeling error variance q(ω, T), and smoothing solution $S^-$ (ω, T) in the voice frame T from the variance measurement part 240 (step 1302).

Then, by using each of the obtained data, the maximum likelihood estimation part 250 calculates a maximum likelihood estimation value S^(ω, T) by the equation 13 (step 1303). The calculated maximum likelihood estimation part S^(ω, T) is transferred to the speech recognition part 260 (step 1304).

Figure 14:
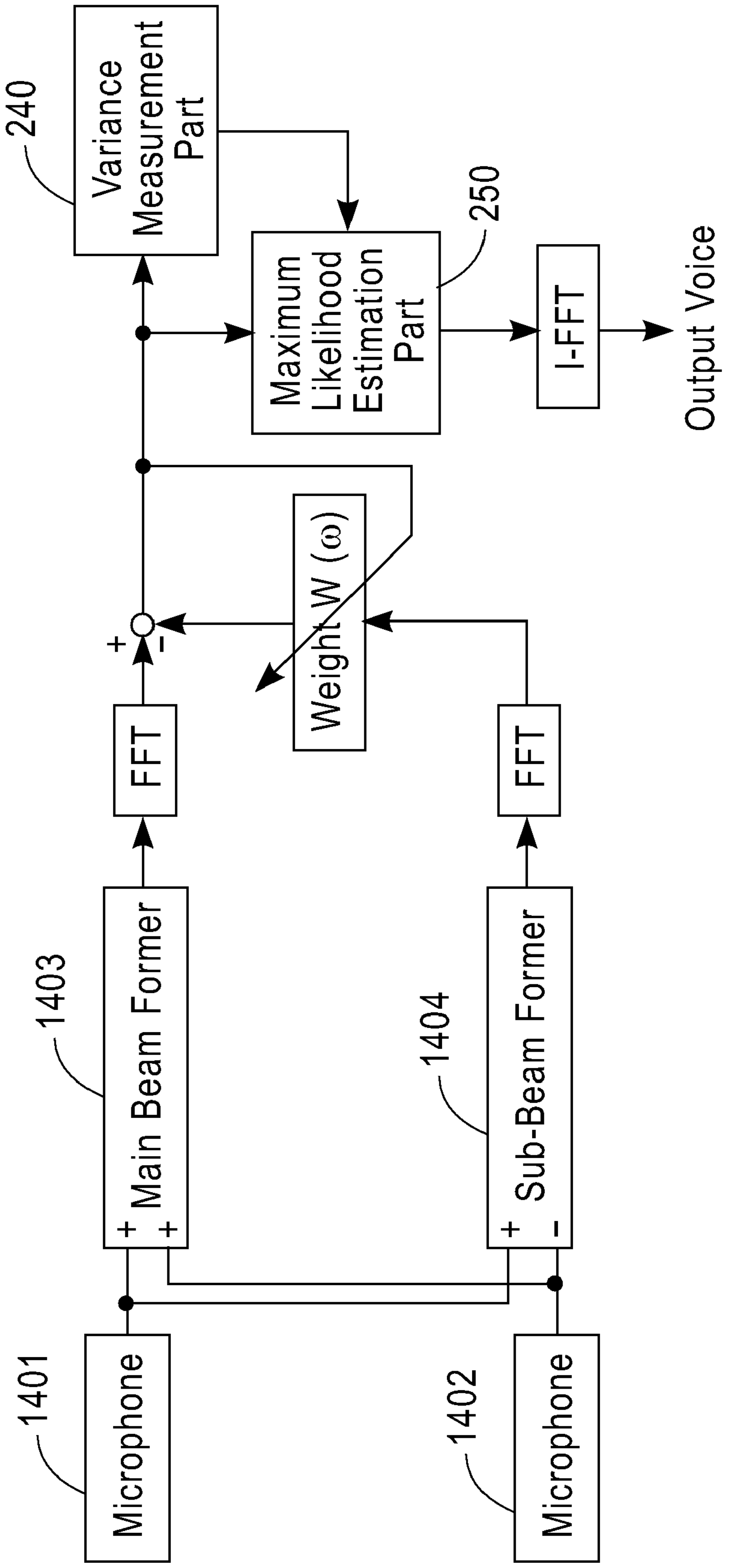
FIG. 14 is a diagram showing a configuration of applying the speech recognition system of the second embodiment to a 2-channel spectral subtraction beam former.

FIG. 14 shows a configuration where a 2-channel spectral subtraction beam former is used for the speech recognition system, and the embodiment is applied thereto.

The 2-channel spectral subtraction beam former shown in FIG. 14 is a beam former using s 2-channel adaptive spectral subtraction method which is a method for adaptively adjusting weight.

In FIG. 14, two microphones 1401, 1402 correspond to the voice input part 210 shown in FIG. 10, and main beam former 1403, and a sub-beam former 1404 realize functions of the sound source localization part 220 and the noise suppression part 230. That is, this 2-channel spectral subtraction beam former executes spectral-subtraction of an output of the sub-beam former 1404 that forms a directional null on a target sound source direction from an output of the main beam former 1403 having directivity pattern on the target sound source direction regarding voices recorded by the two microphones 1401, 1402. The sub-beam former 1404 is considered to output a signal of only a noise component including no voice signals of the target sound source. Each of the outputs of the main beam former 1403 and the sub-beam former 1404 is treated by fast Fourier transformation (FFT). After given predetermined weight W(ω) is incorporated and the subtraction is executed, the above is passed through processes of the variance measurement part 240, the maximum likelihood estimation part 250, and executed to inverse fast Fourier transformation (I-FFT) to be outputted to the speech recognition part 260. Needless to say, if the speech recognition part 260 receives data of a frequency domain as an input, this inverse Fourier transformation can be omitted.

An output power spectrum of the main beam former 1403 is set to $M_1(\omega, T)$, and an output power spectrum of the sub-beam former 1404 is set to $M_2(\omega, T)$. If a signal power and a noise power included in the main beam former 1403 are respectively S and $N_1$, and a noise power included in the sub-beam former is $N_2$, the following relation is provided.

$$M_1(\omega,T)=S(\omega,T)+N_1(\omega,T)$$

$$M_2(\omega,T)=N_2(\omega,T)$$

Here, it is assumed that there is no correlation between a signal and noise.

If an output of the sub-beam former 1404 is multiplied by a weight coefficient W(ω) to be subtracted from an output of the main beam former 1403, its output Z is represented as follows.

$$Z(\omega,T)=M_1(\omega,T)-W(\omega)\cdot M_2(\omega,T)=S(\omega,T)+\{N_1(\omega,T)-W(\omega)\cdot N_2(\omega,T)\}$$

A weight W(ω) is trained to minimize the following by using E[ ] as an expected value operator.

$$E[[N_1(\omega,T)-W(\omega)\cdot N_2(\omega,T)]^2]$$

Figure 15:
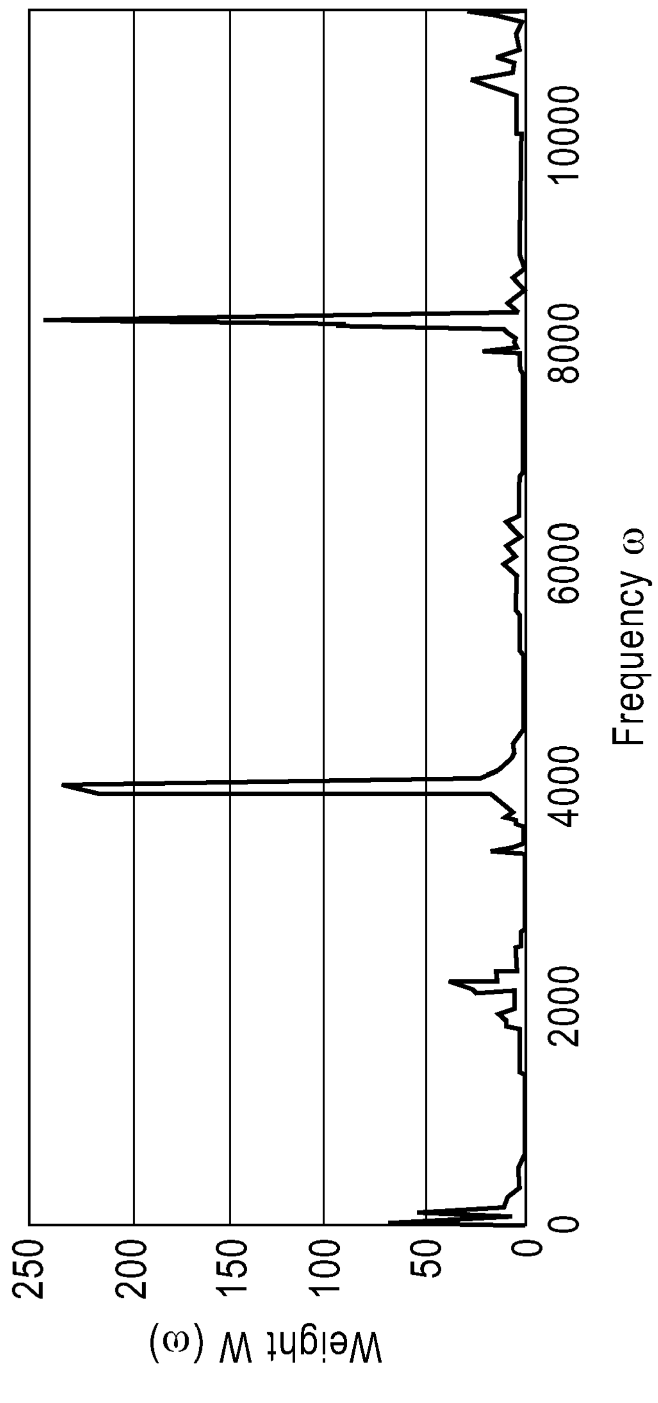
FIG. 15 is a graph showing a learned weight coefficient $W(^{\mathscr{f}})$ when a noise source is arranged on the right by 40 degrees in the second embodiment.

FIG. 15 shows an example of a trained weight coefficient W(ω) when a noise source is arranged on the right by 40 degrees.

Referring to FIG. 15, it can be understood that an especially large value is determined at a specific frequency. At such a frequency, cancellation accuracy of a noise component expected in the above-described equation is considerably reduced. In other words, a large error occurs accompanying in a value of the observed output power Z (ω, T).

Accordingly, a state equation and an observation equation are set as the above-described equations 10, and 11.

Then, the variance measurement part 240 and the maximum likelihood estimation part 250 calculate a maximum likelihood estimation value by the above-described equations 13 to 16.

Thus, if there are no large errors in the value of the output power Z(ω,T), i.e., if almost no noise by aliasing is included in a signal of a recorded voice, a maximum likelihood estimation value near an observation value is treated by an inverse fast Fourier transformation to be outputted to the speech recognition part 260. On the other hand, if a large error is present in the value of the output power Z(ω, T), i.e., if much noise by aliasing is included in the signal of the recorded voice, around a specific frequency causing the aliasing, a maximum likelihood estimation value near a smoothing solution is treated by an inverse fast Fourier transformation to be outputted to the speech recognition part 260.

Figure 16:
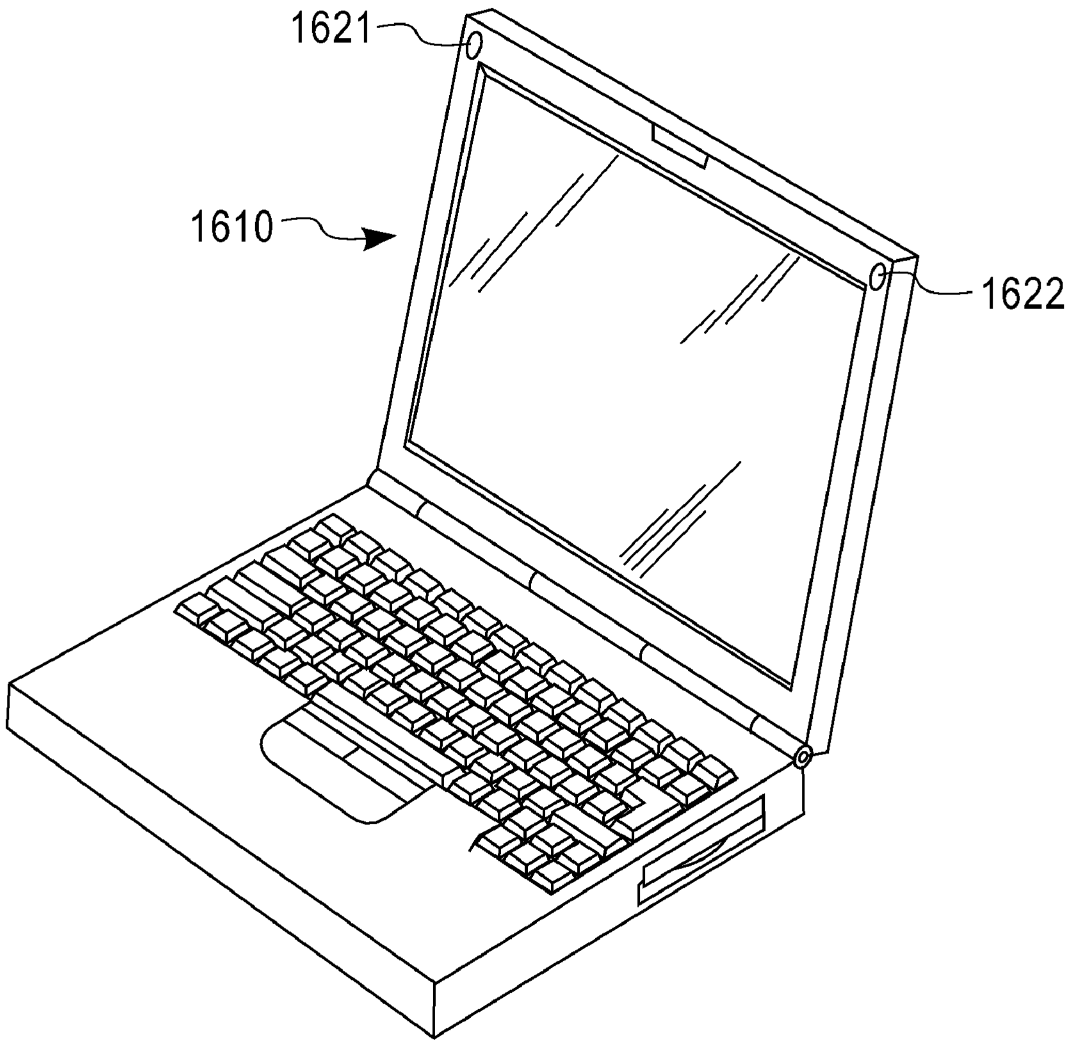
FIG. 16 is a view showing an example of an appearance of a computer provided with the 2-channel spectral subtraction beam former.

FIG. 16 shows an example of an appearance of a computer provided with the 2-channel spectral subtraction shown in FIG. 14 in the speech recognition system.

The computer shown in FIG. 16 is provided with stereo microphones 1621, 16222 in the upper part of a display (LCD) 1610. The stereo microphones 1621, 1622 correspond to the microphones 1401, 1402 shown in FIG. 14, and used as the voice input part 210 shown in FIG. 10. Then, by a program-controlled CPU, the main beam former 1403, and the sub-beam former 1404 functioning as the sound source localization part 220 and the noise suppression part 230, and functions of the variance measurement part 240 and the maximum likelihood estimation part 250 are realized. Thus, speech recognition having effects of aliasing reduced as much as possible can be executed.

The embodiment has been described by taking the example of reducing noise by aliasing conspicuously occurring especially in the 2-channel beam former. Needless to say, however, in addition to the above, the noise canceling technology of the embodiment using the smoothing solution and the maximum likelihood estimation can be used to cancel a variety of noises which cannot be canceled by a method such as the 2-channel spectral subtraction or the profile fitting of the first embodiment.

As described above, according to the present invention, background noise of a sound source other than a target direction sound source can be efficiently canceled from a recorded voice to realize highly accurate speech recognition.

Moreover, according to the present invention, it is possible to provide a method for effectively suppressing inevitable noise such as effects of aliasing in a beam former, and a system using the same.

Although the preferred embodiments of the present invention have been described in detail, it should be understood that various changes, substitutions and alternations can be made therein without departing from spirit and scope of the inventions as defined by the appended claims.

What is claimed is:

1. A speech recognition apparatus comprising:

a microphone array, comprising at least three microphones, each microphone measuring a delay and a sum of peak power for each of a plurality of angles from a horizontal axis and from a vertical axis in response to a white noise source located at a plurality of locations about said microphone array;

a first directional sound source profile database for storing a plurality of first directional sound source profiles, each of said plurality of first directional sound source profiles determining a first direction sound source profile for each of said plurality of locations based on said measuring;

a target location for said microphone array, where a voice and noise are recorded;

a noise suppressor, receiving a voice signal and a noise signal recorded at said target location by said microphone array, said noise suppressor comprising:

an array of delay and sum units, each delay and sum unit introducing a different delay from a range of negative and positive delays into said recording of said voice and said noise signal and producing a sum of peak power for said voice signal associated with each of said plurality of angles from said horizontal axis and with each of said plurality of angles from said vertical axis;

wherein said voice signal associated with an angle of said horizontal axis and an angle of said vertical axis, corresponding to said target location, produces a maximal in-phase sum of peak power signal associated with said target location;

an array of Fourier transform units, each Fourier transform unit corresponding to one of said array of delay and sum units and converting said voice signal from said one of said array of delay and sum units to a voice power distribution for each of a plurality of frequency bands correspondingly associated with each of said plurality of angles from said horizontal axis and from said vertical axis;

an array of second profile fitting units, each said second profile fitting unit approximately decomposing said voice power distribution for each of said plurality of frequency bands, received from each Fourier transform units, providing a number of second profiles corresponding to said plurality of frequency bands, and selecting one of said second profiles based on correlating each of said voice power distributions that are approximately decomposed to each of said plurality of first directional sound source profiles, stored in said first directional sound source profile database, to one direction corresponding to said voice recorded at said target location;

wherein said approximately decomposing comprises evaluating a directional target voice profile that equals a weighted sum of a first directional sound source profile for said white noise source in said one direction of said target location and a non-directional noise profile;

wherein a weight coefficient of said first directional sound source profile and a weight coefficient for said non-directional noise profile are obtained by minimizing an evaluative function; and wherein a power of only a voice signal, without noise components, is determined for each of said plurality of frequency bands, based on said weight coefficient of said first directional sound source profile and said weight coefficient for said non-directional noise profile;

a spectrum reconstruction unit that receives said power of only a voice signal for each of said plurality of frequency bands for reconstructing said power of only a voice recorded at said target location; and an output device that outputs said reconstruction of said power of only a voice recorded at said target location as a voice recording, without noise, from said target location.

2. A speech recognition method measuring for each microphone of a microphone array, comprising at least three microphones, a delay and a sum of peak power for each of a plurality of angles from a horizontal axis and from a vertical axis in response to a white noise source located at a plurality of locations about said microphone array;

determining a first direction sound source profile for each of said plurality of locations based on said measuring;

storing a plurality of first directional sound source profiles in a first directional sound source profile database;

subsequently, recording a voice, located at a target location, and noise from said microphone array;

inputting a voice signal, recorded from said target location, and a noise signal from said recording into a noise suppressor for noise suppressing, said noise suppressing comprising:

introducing different a delay, from a range of negative and positive delays, into said recording of said voice signal and said noise signal by an array of delay and sum units, each said delay producing a sum of peak power for said voice signal associated with each of said plurality of angles from said horizontal axis and with each of said plurality of angles from said vertical axis;

wherein said voice signal associated with an angle of said horizontal axis and an angle of said vertical axis, corresponding to said target location, produces a maximal in-phase sum of peak power signal associated with said target location;

performing Fourier transforms by an array of Fourier transform units on signals received from said array of delay and sum units, each Fourier transform unit corresponding to one of said array of delay and sum units and converting said voice signal from said one of said array of delay and sum units to a voice power distribution for each of a plurality of frequency bands correspondingly associated with each of said plurality of angles from said horizontal axis and from said vertical axis;

approximately decomposing said voice power distributions, received from each of said Fourier transform units for each one of said plurality of frequency bands, by an array of second profile fitting units, each said second profile fitting unit providing a number of second profiles corresponding to said plurality of frequency bands and selecting one of said second profiles based on correlating each of said voice power distributions that are approximately decomposed to each of said plurality of first directional sound source profiles, stored in said first directional sound source profile database, to one direction corresponding to said voice recorded at said target location;

wherein said approximately decomposing comprises evaluating a directional target voice profile that equals a weighted sum of a first directional sound source profile for said white noise source in said one direction of said target location and a non-directional noise profile;

wherein a weight coefficient of said first directional sound source profile and a weight coefficient for said non-directional noise profile are obtained by minimizing an evaluative function; and wherein a power of only a voice signal, without noise, is determined for each said plurality of frequency bands, based on said weight coefficient of said first directional sound source profile and said weight coefficient for said non-directional noise profile;

transferring said power of only a voice signal for each of said plurality of frequency bands to a spectrum reconstruction unit for reconstructing said power of only a voice recorded at said target location; and outputting said reconstructing of said power of only a voice recorded at said target location as a voice recording, without noise, from said target location.

3. A program storage device readable by machine, tangibly embodying a program of instructions executable by said machine to perform a method of speech recognition, said method comprising:

measuring for each microphone of a microphone array, comprising at least three microphones, a delay and a sum of peak power for each of a plurality of angles from a horizontal axis and from a vertical axis in response to a white noise source located at a plurality of locations about said microphone array;

determining a first direction sound source profile for each of said plurality of locations based on said measuring;

storing a plurality of first directional sound source profiles in a first directional sound source profile database;

subsequently, recording a voice, located at a target location, and noise from said microphone array;

inputting a voice signal, recorded from said target location, and a noise signal from said recording into a noise suppressor for noise suppressing, said noise suppressing comprising:

introducing different a delay, from a range of negative and positive delays, into said recording of said voice signal and said noise signal by an array of delay and sum units, each said delay producing a sum of peak power for said voice signal associated with each of said plurality of angles from said horizontal axis and with each of said plurality of angles from said vertical axis;

wherein said voice signal associated with an angle of said horizontal axis and an angle of said vertical axis, corresponding to said target location, produces a maximal in-phase sum of peak power signal associated with said target location;

performing Fourier transforms by an array of Fourier transform units on signals received from said array of delay and sum units, each Fourier transform unit corresponding to one of said array of delay and sum units and converting said voice signal from said one of said array of delay and sum units to a voice power distribution for each of a plurality of frequency bands correspondingly associated with each of said plurality of angles from said horizontal axis and from said vertical axis;

approximately decomposing said voice power distributions, received from each of said Fourier transform units for each one of said plurality of frequency bands, by an array of second profile fitting units, each said second profile fitting unit providing a number of second profiles corresponding to said plurality of frequency bands and selecting one of said second profiles based on correlating each of said voice power distributions that are approximately decomposed to each of said plurality of first directional sound source profiles, stored in said first directional sound source profile database, to one direction corresponding to said voice recorded at said target location;

wherein said approximately decomposing comprises evaluating a directional target voice profile that equals a weighted sum of a first directional sound source profile for said white noise source in said one direction of said target location and a non-directional noise profile;

wherein a weight coefficient of said first directional sound source profile and a weight coefficient for said non-directional noise profile are obtained by minimizing an evaluative function; and wherein a power of only a voice signal, without noise, is determined for each said plurality of frequency bands, based on said weight coefficient of said first directional sound source profile and said weight coefficient for said non-directional noise profile;

transferring said power of only a voice signal for each of said plurality of frequency bands to a spectrum reconstruction unit for reconstructing said power of only a voice recorded at said target location; and outputting said reconstructing of said power of only a voice recorded at said target location as a voice recording, without noise, from said target location.

* * * * *